United States Patent
Clarke et al.

(10) Patent No.: US 11,140,119 B2
(45) Date of Patent: Oct. 5, 2021

(54) MESSAGE REROUTING FROM AN E-MAIL ENVIRONMENT TO A MESSAGING ENVIRONMENT

(71) Applicant: LIVEPERSON, INC., New York, NY (US)

(72) Inventors: Fred Clarke, Bellevue, WA (US); Andrew Lader, Redmond, WA (US); Aparna Kulkarni, Bellevue, WA (US); Avi Kedmi, New York, NY (US)

(73) Assignee: LIVEPERSON, INC., New York, NY (US)

( * ) Notice: Subject to any disclaimer, the term of this patent is extended or adjusted under 35 U.S.C. 154(b) by 0 days.

(21) Appl. No.: 17/083,840

(22) Filed: Oct. 29, 2020

(65) Prior Publication Data

US 2021/0136028 A1    May 6, 2021

Related U.S. Application Data

(60) Provisional application No. 62/927,892, filed on Oct. 30, 2019.

(51) Int. Cl.
| | |
|---|---|
| *G06F 15/16* | (2006.01) |
| *H04L 12/58* | (2006.01) |
| *G06F 40/169* | (2020.01) |
| *G06Q 10/06* | (2012.01) |
| *G06Q 10/10* | (2012.01) |
| *G06F 16/23* | (2019.01) |
| *G06Q 30/00* | (2012.01) |

(52) U.S. Cl.
CPC .......... *H04L 51/36* (2013.01); *G06F 40/169* (2020.01); *G06Q 10/063112* (2013.01); *G06Q 10/107* (2013.01); *H04L 51/02* (2013.01); *H04L 51/16* (2013.01); *G06F 16/2379* (2019.01); *G06Q 30/016* (2013.01)

(58) Field of Classification Search
CPC ......... H04L 51/36; H04L 51/02; H04L 51/16; G06F 40/169; G06F 16/2379; G06Q 10/063112; G06Q 10/107; G06Q 30/016
USPC ....................................................... 709/206
See application file for complete search history.

(56) References Cited

U.S. PATENT DOCUMENTS

| | | | | |
|---|---|---|---|---|
| 2004/0158611 A1* | 8/2004 | Daniell | ................... | H04L 51/04 709/206 |
| 2005/0080852 A1* | 4/2005 | Kelley | ................... | H04L 51/04 709/206 |
| 2008/0215688 A1* | 9/2008 | Peisl | ................... | G06Q 10/107 709/206 |

(Continued)

FOREIGN PATENT DOCUMENTS

| | | |
|---|---|---|
| EP | 3 122 001 A1 | 1/2017 |
| WO | WO 2016/176094 A1 | 11/2016 |

OTHER PUBLICATIONS

International Search Report and Written Opinion for PCT Application No. PCT/US2020/057905 dated Feb. 11, 2021, 8 pages.

*Primary Examiner* — Imad Hussain
(74) *Attorney, Agent, or Firm* — Polsinelli LLP

(57) ABSTRACT

The present disclosure relates generally to facilitating routing of communications. More specifically, techniques are provided to dynamically reroute messages. For example, embodiments can redirect a communication from an e-mail environment to a messaging environment in order to perform services with one or more clients.

27 Claims, 14 Drawing Sheets

(56) References Cited

U.S. PATENT DOCUMENTS

| | | | |
|---|---|---|---|
| 2010/0291902 A1* | 11/2010 | Emerson | H04L 51/066 455/412.1 |
| 2011/0096919 A1* | 4/2011 | Daye | H04M 3/5233 379/265.12 |
| 2013/0238728 A1* | 9/2013 | Fleck | G06Q 10/10 709/206 |
| 2013/0262168 A1* | 10/2013 | Makanawala | H04L 51/32 705/7.14 |
| 2016/0330144 A1 | 11/2016 | Dymetman et al. | |
| 2016/0358242 A1* | 12/2016 | Lagos | G06Q 30/02 |
| 2017/0308533 A1 | 10/2017 | Lu et al. | |
| 2019/0266254 A1* | 8/2019 | Blumenfeld | G06Q 40/08 |
| 2020/0293587 A1* | 9/2020 | Ayers | G06F 40/205 |
| 2020/0293619 A1* | 9/2020 | Ayers | G06F 40/35 |

\* cited by examiner

Email Connect

Setup New Email

Email Account

Email Account
*e.g. Sales, Customer Support, etc.*

Email Address
*Enter email address*

Username
*Same as email address*

Password
*Enter password*

Incoming email

Account Type
IMAP ▽

Incoming Email Server
*Enter incoming email server*

Port
993

☒ Use SSL to connect (required)

Outgoing email

Account Type
SMTP ▽

Outgoing Email Server
*Enter outgoing email server*

Port
587

☐ Use SSL to connect ( Cancel )  ( Save )

( Test Connection )

FIG. 10

E-mail Template Design (Optional)

Before uploading your header and footer, download our example and modify it with your content updates.

Download HTML Example

E-mail Header (HTML format)
| MyBrand_EmailConnect_Header.html | Upload |

E-mail Footer (HTML format)
| MyBrand_EmailConnect_Footer.html | Upload |

Agent Workspace

Conversations

Russell Metcalf
"I am having an iss..."

Russell Metcalf

Hi,

I am having an issue with my TV. I can't seem to get a clear picture and I was hoping to have every set for the big game.

Could you please help?

Thanks,
Russ

Hello Russ,

I am sorry you are experiencing an issue with your TV. Have you tried updating the TV through our update widget?

Sincerely,
Chris Lockett

Message Details

Message Type: E-mail

Client E-mail Address Used: techsupport@example.com

User E-mail Address: DangerRuss@example.org

FIG. 13

MESSAGE REROUTING FROM AN E-MAIL ENVIRONMENT TO A MESSAGING ENVIRONMENT

CROSS-REFERENCE TO RELATED APPLICATIONS

The present patent application claims the priority benefit of U.S. provisional patent application No. 62/927,892 filed Oct. 30, 2019, the disclosures of which are incorporated by reference herein.

FIELD

The present disclosure relates generally to facilitating routing of communications. More specifically, techniques are provided to dynamically reroute messages. For example, embodiments can redirect a communication from an e-mail environment to a messaging environment in order to perform services with one or more clients.

BACKGROUND

Clients often use e-mail to communicate with users on a variety of topics. However, the widespread popularity of e-mail has led to an overabundance of e-mail messages being sent and received, with as many as 1,216 messages received each month. For example, it is estimated that 124.5 billion business e-mails are sent and received every day. However, in 2018, business-to-consumer e-mails only had a 20.7% open rate, with a click-through rate of 4.2%. The average user response time to an e-mail is 2.5 days, average conversion rate is 3.3%, and 90% of e-mails are spam. Conversions are measured as someone taking the desired action, such as a sale, coupon use, form completion, etc.

SMS (short message service) is a text messaging service enabling text-based communication between two mobile phone devices using standardized communication protocols. MMS (multimedia message service) is a messaging service enabling communication between two mobile phone devices that can send images as well as text using standardized communication protocols. Messaging services are convenient for users in that they enable asynchronous communication, alerting users when a message comes in without the users having to pay constant attention as they would during a traditional audio-based telephone call. In contrast to e-mail, the global average open rate of SMS in 2018 was 95%, user response time is 90 seconds, and link click-through rate is 19%. The average number of conversions is 32%, an average of only 178 text messages are received each month, and only 1% of text messages are spam. Similar statistics exist for other messaging channels, such as Apple Business Chat, WhatsApp, Web Messaging and Facebook Messenger.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

There is a need in the art for improved and intelligent rerouting of communications from an e-mail environment to a messaging environment. A network device (e.g., a user's device) may be used to generate an e-mail to a client device (e.g., a business's device). A communication management system may intercept the e-mail and extract, from the e-mail, an intent or request of the user. The communication management system may transmit the intent or request over a chat communication channel, through which an agent, using the client device, may review the intent or request via a chat window. The agent, via the client device, can submit a response to the intent or request over the chat communication channel to the communication management system. The communication management system may generate an e-mail to the network device that includes the response and a conversation history between the network device and the client device.

Certain embodiments of the present disclosure include a computer-implemented method. The method comprises receiving a request e-mail message addressed to an account associated with a client. The request e-mail message includes a body and the body specifies an intent. The method further comprises identifying a recipient for the request e-mail message. The recipient is associated with the account. The method further comprises extracting the intent from the body of the request e-mail message. The method further comprises transmitting the intent over a chat communication channel. When the intent is received by the recipient, the recipient can respond using the chat communication channel. The method further comprises receiving a response to the intent over the chat communication channel. The method further comprises generating a response e-mail message. The response e-mail message includes the response and a conversation history associated with the recipient and a sender of the request e-mail message. Further, the response and the conversation history are included in a body of the response e-mail message. The method further comprises transmitting the response e-mail message.

In some embodiments, the intent is transmitted to the recipient with the conversation history associated with the recipient and the sender of the request e-mail message, wherein the intent is incorporated into the conversation history. In some embodiments, the account is associated with a group of recipients and the method further comprises identifying the recipient from the group of recipients based on the intent. In some embodiments, the account associated with the client is further associated with a skill and the recipient is identified as a result of the recipient being assigned to the skill. In some embodiments, the method further comprises inserting a header and footer into the response e-mail message, wherein the header and the footer are associated with the client. In some embodiments, the method further comprises polling a client server to receive the request e-mail message. In some embodiments, the method further comprises receiving another e-mail message, determining that a conversation session corresponding to the request e-mail message is active, and transmitting a response to the other e-mail message. The response to the other e-mail message includes an instruction to utilize the conversation session corresponding to the request e-mail message.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended figures:

FIG. 10 shows an illustrative example of an interface for configuring e-mail message settings to enable e-mail messages from users to be routed to a corresponding agent, group of agents, or bot in accordance with at least one embodiment;

FIG. 12 shows an illustrative example of an interface for configuring e-mail message headers and footers to be included in client e-mail message responses in accordance with at least one embodiment;

FIG. 13 shows an illustrative example of an interface for engaging in a conversation with a user to address an intent or request in accordance with at least one embodiment.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred examples of embodiment(s) only and is not intended to limit the scope, applicability or configuration of the disclosure. Rather, the ensuing description of the preferred examples of embodiment(s) will provide those skilled in the art with an enabling description for implementing a preferred examples of embodiment. It is understood that various changes can be made in the function and arrangement of elements without departing from the spirit and scope as set forth in the appended claims.

Figure 1:
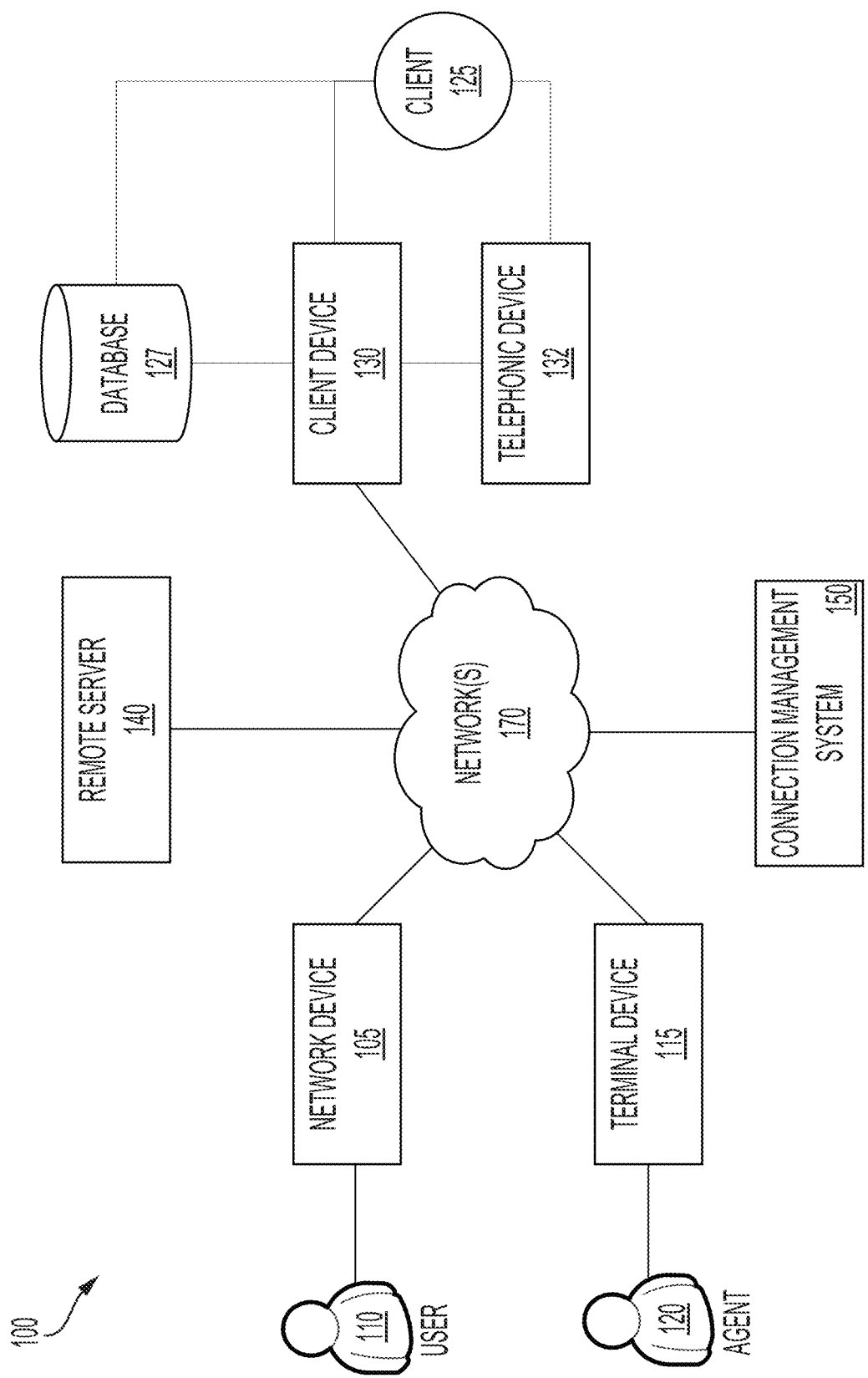
FIG. 1 shows a block diagram of an embodiment of a network interaction system.

FIG. 1 shows a block diagram 100 of an embodiment of a network interaction system which implements and supports certain embodiments and features described herein. Certain embodiments relate to establishing a connection channel between a network device 105 (which can be operated by a user 110) and a client device 130 associated with a client 125. In certain embodiments, the network interaction system can include a terminal device 115 (which can be operated by an agent 120).

In certain embodiments, a user 110 can be an individual attempting to contact a client 125 via telephonic device 132. A client 125 can be an entity that provides, operates, or runs a service, or individuals employed by or assigned by such an entity to perform the tasks available to a client 125 as described herein. The agent 120 can be an individual, such as a support agent tasked with providing support or information to the user 110 regarding the service. Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual attempting to book an appointment via a cell phone, a client 125 can be a company that provides medical services, and an agent 120 can be a representative employed by the company. In various embodiments, the user 110, client 125, and agent 120 can be other individuals or entities.

While FIG. 1 shows only a single network device 105, terminal device 115 and client device 130, an interaction system can include multiple or many (e.g., tens, hundreds or thousands) of each of one or more of these types of devices. Similarly, while FIG. 1 shows only a single user 110, agent 120 and client 125, an interaction system 100 can include multiple or many of each of one or more of such entities. Thus, it may be necessary to determine which terminal device is to be selected to communicate with a given network device. Further complicating matters, a remote server 140 may also be configured to receive and respond to select network-device communications.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some instances, connection management system 150 routes the entire communication to another device. In some instances, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connection channels between network device 105 and one or more terminal devices 115. For example, upon receiving a communication from network device 105, connection management system 150 can first estimate to which client (if any) the communication corresponds. Upon identifying a client, connection management system 150 can identify a terminal device 115 associated with the client for communication with network device 105. In some instances, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message.

In some instances, connection management system 150 can determine whether any connection channels are established between network device 105 and a terminal device associated with the client (or remote server 140) and, if so, whether such channel is to be used to exchange a series of communications including the communication.

Upon selecting a terminal device 115 to communicate with network device 105, connection management system 150 can establish a connection channel between the network device 105 and terminal device 115. In some instances, connection management system 150 can transmit a message to the selected terminal device 115. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In one instance, communications between network device 105 and terminal device 115 can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets.

In some embodiments, connection management system 150 can monitor the communication exchange in real-time and perform automated actions (e.g., rule-based actions) based on the live communications. For example, when connection management system 150 determines that a communication relates to a particular item (e.g., product), connection management system 150 can automatically transmit an additional message to terminal device 115 containing additional information about the item (e.g., quantity of item available, links to support documents related to the item, or other information about the item or similar items).

In one instance, a designated terminal device 115 can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some instances, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RCS, etc.

A network device 105, terminal device 115 and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
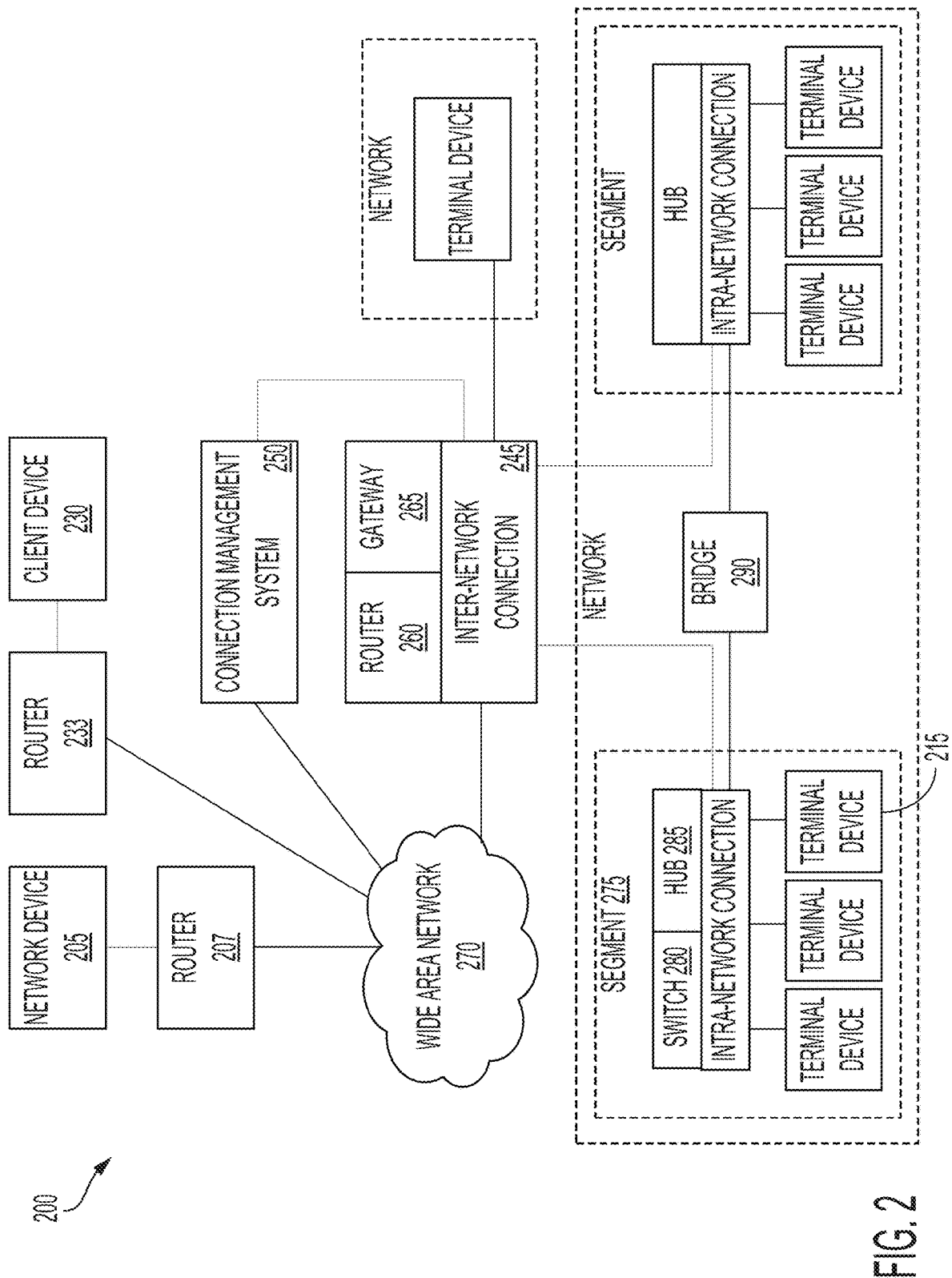
FIG. 2 shows a block diagram of an embodiment of a network interaction system that includes a connection management system.

FIG. 2 shows a block diagram 200 of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some instances, a communication from network device 205 includes destination data (e.g., a destination IP address) that at least partly or entirely indicates which terminal device is to receive the communication. Network interaction system 200 can include one or more inter-network connection components 240 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some instances, a local-area network 235 can be divided into multiple segments, each of which can be associated with independent firewalls, security rules and network protocols. An intra-network connection component 255 can be provided in each of one, more or all segments to facilitate intra-segment routing. A bridge 280 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, in some instances, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

In FIG. 2, connection management system 250 can be configured to serve as a relay and/or destination address. Thus, for example, a set of network devices 205 may transmit communications, each identifying connection management system 250 as a destination. Connection management system 250 can receive each communication and can concurrently monitor a set of terminal devices (e.g., so as to generate metrics for each terminal device). Based on the monitoring and a rule, connection management system 250 can identify a terminal device 215 to which it may relay each communication. Depending on the embodiment, terminal device communications may similarly be directed to a consistent destination (e.g., of connection management system 250) for further relaying, or terminal devices may begin communicating directly with corresponding network devices. These embodiments can facilitate efficient routing and thorough communication monitoring.

It will be appreciated that many variations of FIG. 2 are contemplated. For example, connection management system 250 may be associated with a connection component (e.g., inter-network connection component 245 or intra-network connection component 255) such that an application corresponding to connection management system 250 (or part thereof) is installed on the component. The application may, for example, perform independently or by communicating with one or more similar or complementary applications (e.g., executing on one or more other components, network devices or remotes servers).

Figure 3:
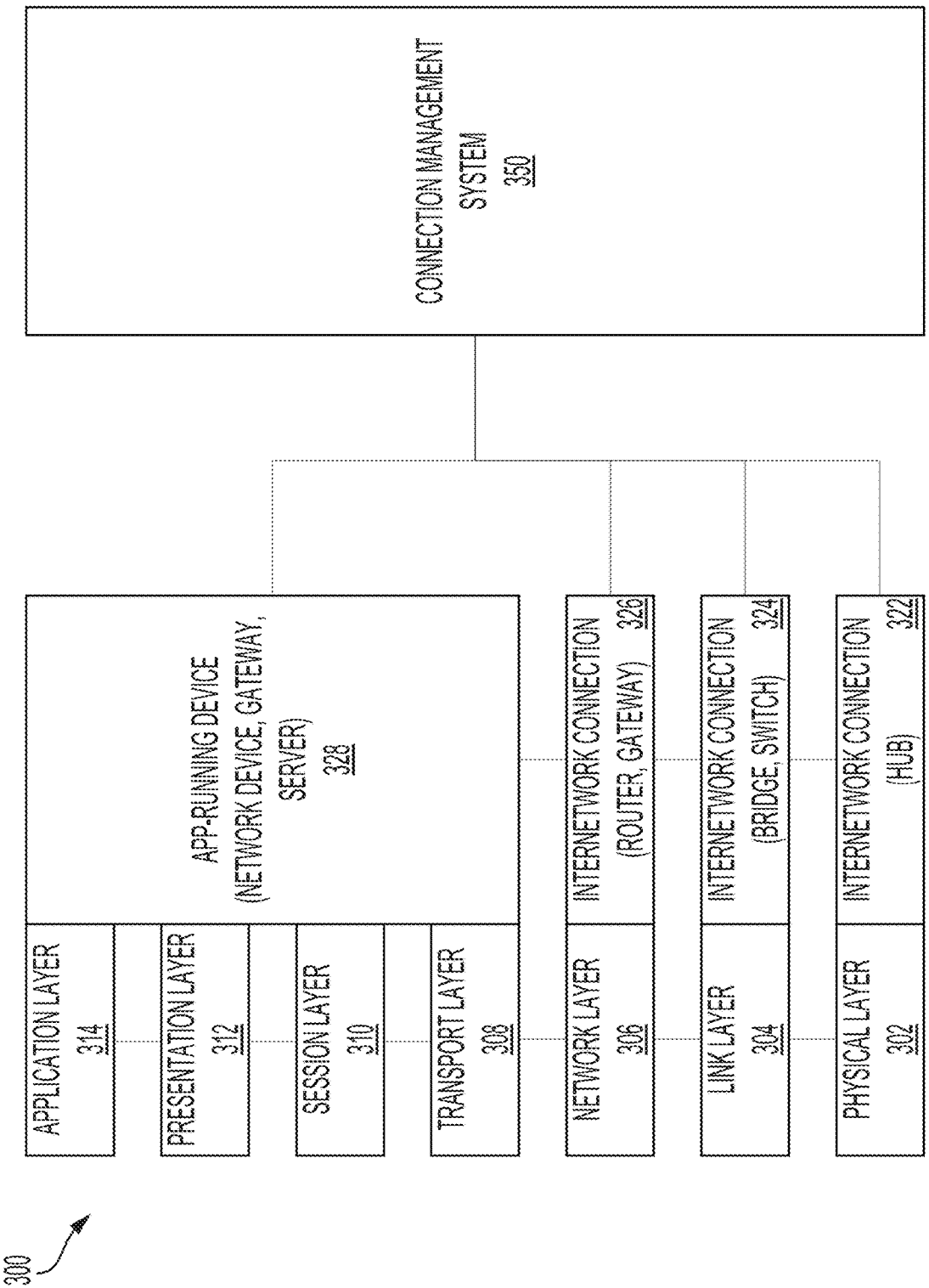
FIG. 3 shows a representation of a protocol-stack mapping of connection components' operation.

FIG. 3 shows a representation 300 of a protocol-stack mapping of connection components' operation. More specifically, FIG. 3 identifies a layer of operation in an Open Systems Interaction (OSI) model that corresponds to various connection components.

The OSI model can include multiple logical layers 302-314. The layers are arranged in an ordered stack, such that layers 302-312 each serve a higher level and layers 304-314 is each served by a lower layer. The OSI model includes a physical layer 302. Physical layer 302 can define parameters physical communication (e.g., electrical, optical, or electromagnetic). Physical layer 302 also defines connection management protocols, such as protocols to establish and close connections. Physical layer 302 can further define a flow-control protocol and a transmission mode.

A link layer 304 can manage node-to-node communications. Link layer 304 can detect and correct errors (e.g., transmission errors in the physical layer 302) and manage access permissions. Link layer 404 can include a media access control (MAC) layer and logical link control (LLC) layer.

A network layer 306 can coordinate transferring data (e.g., of variable length) across nodes in a same network (e.g., as datagrams). Network layer 306 can convert a logical network address to a physical machine address.

A transport layer 308 can manage transmission and receipt quality. Transport layer 308 can provide a protocol for transferring data, such as a Transmission Control Protocol (TCP). Transport layer 308 can perform segmentation/desegmentation of data packets for transmission and can detect and account for transmission errors occurring in layers 302-306. A session layer 310 can initiate, maintain and terminate connections between local and remote applications. Sessions may be used as part of remote-procedure interactions. A presentation layer 312 can encrypt, decrypt and format data based on data types known to be accepted by an application or network layer.

An application layer 314 can interact with software applications that control or manage communications. Via such applications, application layer 314 can (for example) identify destinations, local resource states or availability and/or communication content or formatting. Various layers 302-314 can perform other functions as available and applicable.

Intra-network connection components 322, 324 are shown to operate in physical layer 302 and link layer 304. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 326, 328 are shown to operate on higher levels (e.g., layers 306-314). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 350 can interact with and/or operate on, in various embodiments, one, more, all or any of the various layers. For example, connection management system 350 can interact with a hub so as to dynamically adjust which terminal devices or client devices the hub communicates. As another example, connection management system 350 can communicate with a bridge, switch, router or gateway so as to influence which terminal device the component selects as a destination (e.g., MAC, logical or physical) address. By way of further examples, a connection management system 350 can monitor, control, or direct segmentation of data packets on transport layer 308, session duration on session layer 310, and/or encryption and/or compression on presentation layer 312. In some embodiments, connection management system 350 can interact with various layers by exchanging communications with (e.g., sending commands to) equipment operating on a particular layer (e.g., a switch operating on link layer 304), by routing or modifying existing communications (e.g., between a network device and a client device) in a particular manner, and/or by generating new communications containing particular information (e.g., new destination addresses) based on the existing communication. Thus, connection management system 350 can influence communication routing and channel establishment (or maintenance or termination) via interaction with a variety of devices and/or via influencing operating at a variety of protocol-stack layers.

Figure 4:
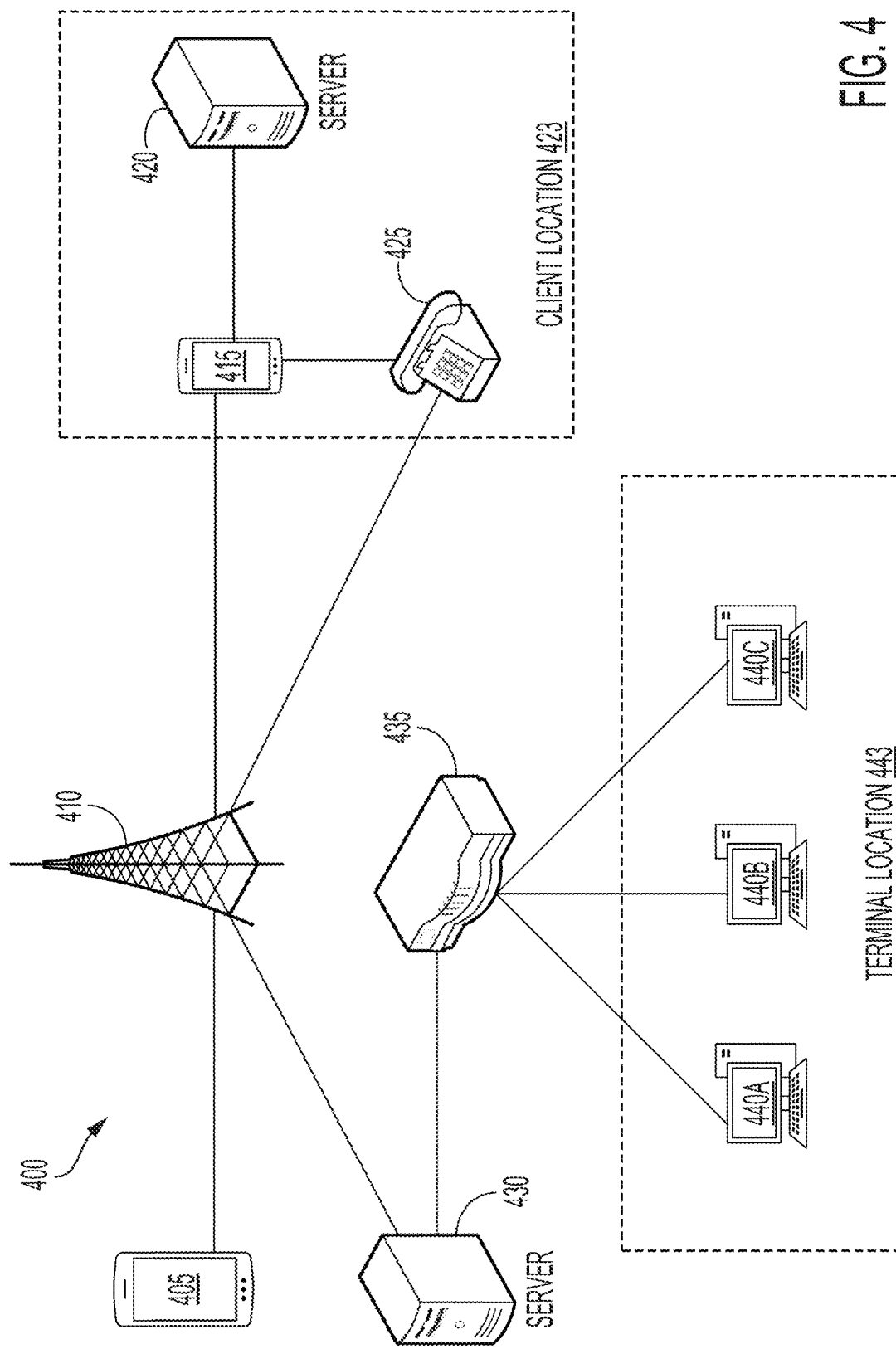
FIG. 4 represents a multi-device communication exchange system according to an embodiment.

FIG. 4 represents a multi-device communication exchange system 400 according to an embodiment. The system includes a network device 405 configured to communicate with a variety of types of terminal devices and client devices over a variety of types of communication channels.

In the depicted instance, network device 405 can transmit a telephonic or text message communication over a cellular network (e.g., via a base station 410). The communication can be routed to a client location 423 or a terminal location 443. A connection management system 430 receives the communication and identifies which client device or terminal device is to respond to the communication. Such determination can depend on identifying a client to which that communication pertains (e.g., based on a content analysis or user input indicative of the client) and determining one or more metrics for each of one or more terminal devices associated with the client. For example, in FIG. 4, each cluster of terminal devices 440*a-c* can correspond to a different client. The terminal devices may be geographically co-located or disperse. The metrics may be determined based on stored or learned data and/or real-time monitoring (e.g., based on availability).

Connection management system 430 can communicate with various terminal devices and client devices and other components via one or more routers 435 or other inter-network or intra-network connection components. Connection management system 430 may collect, analyze and/or store data from or pertaining to communications, terminal-device operations, client rules, and/or user-associated actions (e.g., online activity) at one or more data stores. Such data may influence communication routing.

The client device 415 may be capable of receiving and processing e-mail communications and text messages. In order to process received communications from network device 405, client device 415 may be coupled to a server 420. Server 420 may receive and respond to inquiries from client device 415 for information regarding the goods or services provided at the client location 423, such as product information, an appointment schedule, hours of operation, location information, contact information, and the like.

Figure 5:
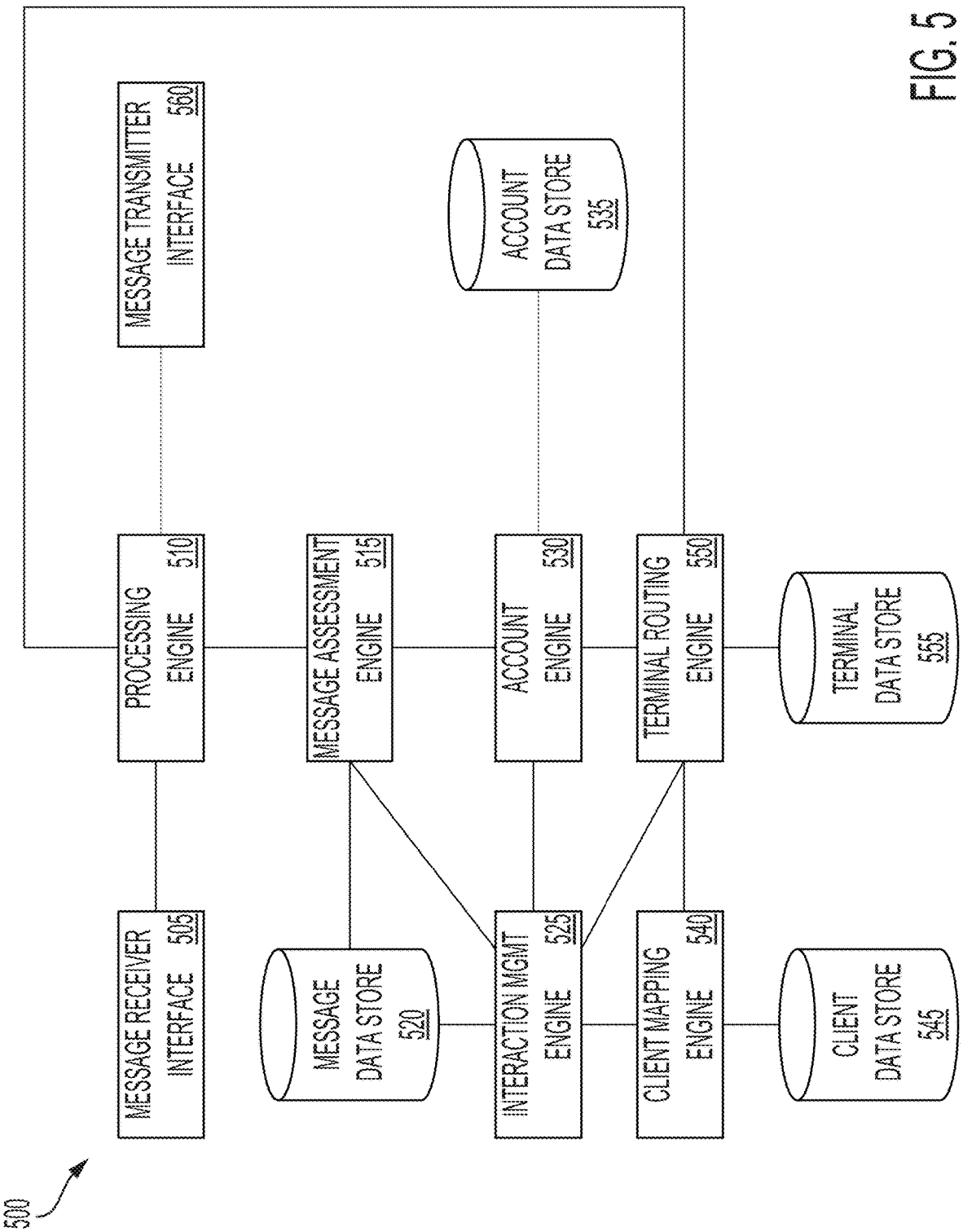
FIG. 5 shows a block diagram of an embodiment of a connection management system.

FIG. 5 shows a block diagram 500 of an embodiment of a connection management system. A message receiver interface 505 can receive a message. In some instances, the message can be received, for example, as part of a communication transmitted by a source device (e.g., housed separately from connection management system or within a same housing), such as a network device. In some instances, the communication can be part of a series of communications or a communicate exchange, which can include a series of messages or message exchange being routed between two devices (e.g., a network device and a client device). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some instances, the message can include a message generated based on inputs received at a local or remote user interface. For example, the message can include a message that was generated based on button or key presses or recorded speech signals. In one instance, the message includes an automatically generated message, such as one generated upon detecting that a network device has provided a particular input command (e.g., key sequence). The message can include an instruction or request, such as one to initiate a communication exchange.

In some instances, the message can include or be associated with an identifier of a client. For example, the message can explicitly identify the client (or a device associated with the client); the message can include or be associated with a webpage or app page associated with the client; the message can include or be associated with a destination address associated with a client; or the message can include or be associated with an identification of an item (e.g., product) or service associated with the client. To illustrate, a network device may be presenting an app page of a particular client, which may offer an option to transmit a communication to an agent. Upon receiving user input corresponding to a message, a communication may be generated to include the message and an identifier of the particular client (e.g., a text message to a phone number).

A processing engine 510 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

A message assessment engine 515 may assess the (e.g., extracted or received) message. The assessment can include identifying, for example, one or more categories or tags for the message. Examples of category or tag types can include (for example) topic, sentiment, complexity, and urgency. A difference between categorizing and tagging a message can be that categories can be limited (e.g., according to a predefined set of category options), while tags can be open. A topic can include, for example, a technical issue, a use question, or a request. A category or tag can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency).

In some instances, message assessment engine 515 can determine a metric for a message. A metric can include, for example, a number of characters, words, capital letters, all-capital words or instances of particular characters or punctuation marks (e.g., exclamation points, question marks and/or periods). A metric can include a ratio, such as a fraction of sentences that end with an exclamation point (or question mark), a fraction of words that are all capitalized, and so on.

Message assessment engine 515 can store a message, message metric and/or message statistic in a message data store 520. Each message can also be stored in association with other data (e.g., metadata), such as data identifying a corresponding source device, destination device, network device, terminal device, client, one or more categories, one or more stages and/or message-associated statistics). Various components of the connection management system (e.g., message assessment engine 515 and/or an interaction management engine 525) can query message data store 520 to retrieve query-responsive messages, message metrics and/or message statistics.

An interaction management engine 525 can determine to which device a communication is to be routed and how the receiving and transmitting devices are to communicate. Each of these determinations can depend, for example, on whether a particular network device (or any network device associated with a particular user) has previously communicated with a client device or terminal device in a set of terminal devices (e.g., any terminal device associated with the connection management system or any terminal device associated with one or more particular clients).

In some instances, when a network device (or other network device associated with a same user or profile) has previously communicated with a given terminal device, communication routing can be generally biased towards the same terminal device. Other factors that may influence routing can include, for example, whether the terminal device (or corresponding agent) is available and/or a predicted response latency of the terminal device. Such factors may be considered absolutely or relative to similar metrics corresponding to other terminal devices. A re-routing rule (e.g., a client-specific or general rule) can indicate how such factors are to be assessed and weighted to determine whether to forego agent consistency.

When a network device (or other network device associated with a same user or account) has not previously communicated with a given terminal device, a terminal-device selection can be performed based on factors such as, for example, an extent to which various agents' knowledge base corresponds to a communication topic, availability of various agents at a given time and/or over a channel type, types and/or capabilities of terminal devices (e.g., associated with the client). In one instance, a rule can identify how to determine a sub-parameter to one or more factors such as these and a weight to assign to each parameter. By combining (e.g., summing) weighted sub-parameters, a parameter for each agent can be determined. A terminal device selection can then be made by comparing terminal devices' parameters.

With regard to determining how devices are to communicate, interaction management engine 525 can (for example) determine whether a client device or terminal device is to respond to a communication via (for example) SMS message, e-mail communication, voice call, video communication, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more terminal devices. Appreciably, some communication types will result in real-time communication (e.g., where fast message response is expected), while others can result in asynchronous communication (e.g., where delays (e.g., of several minutes or hours) between messages are acceptable).

Further, interaction management engine 525 can determine whether a continuous channel between two devices should be established, used or terminated. A continuous channel can be structured so as to facilitate routing of future communications from a network device to a specified terminal device or client device. This bias can persist even across message series. In some instances, a representation of a continuous channel (e.g., identifying an agent) can be included in a presentation to be presented on a network device. In this manner, a user can understand that communications are to be consistently routed so as to promote efficiency.

In one instance, a parameter can be generated using one or more factors described herein and a rule (e.g., that includes a weight for each of the one or more factors) to determine a connection parameter corresponding to a given network device and terminal device. The parameter may pertain to an overall match or one specific to a given communication or communication series. Thus, for example, the parameter may reflect a degree to which a given terminal device is predicted to be suited to respond to a network-device communication. In some instances, a parameter analysis can be used to identify each of a terminal device to route a given communication to and whether to establish, use or terminate a connection channel. When a parameter analysis is used to both address a routing decision and a channel decision, a parameter relevant to each decision may be determined in a same, similar or different manner.

Thus, for example, it will be appreciated that different factors may be considered depending on whether the parameter is to predict a strength of a long-term match versus one to respond to a particular message query. For example, in the former instance, considerations of overall schedules and time zones may be important, while in the latter instance, immediate availability may be more highly weighted. A parameter can be determined for a single network-device/terminal-device combination, or multiple parameters can be determined, each characterizing a match between a given network device and a different terminal device.

To illustrate, a set of three terminal devices associated with a client may be evaluated for potential communication routing. A parameter may be generated for each that relates to a match for the particular communication. Each of the first two terminal devices may have previously communicated with a network device having transmitted the communication. An input from the network device may have indicated positive feedback associated with an interaction with the communication(s) with the first device. Thus, a past-interact sub-parameter (as calculated according to a rule) for the first, second and third devices may be 10, 5, and 0, respectively. (Negative feedback inputs may result in negative sub-parameters.) It may be determined that only the third terminal device is available. It may be predicted that the second terminal device will be available for responding within 15 minutes, but that the first terminal device will not be available for responding until the next day. Thus, a fast-response sub-parameter for the first, second and third devices may be 1, 3 and 10. Finally, it may be estimated a degree to which an agent (associated with the terminal device) is knowledgeable about a topic in the communication. It may be determined that an agent associated with the third terminal device is more knowledgeable than those associated with the other two devices, resulting in sub-parameters of 3, 4 and 9. In this example, the rule does not include weighting or normalization parameters (though, in other instances, a rule may), resulting in parameters of 14, 11 and 19. Thus, the rule may indicate that the message is to be routed to a device with the highest parameter, that being the third terminal device. If routing to a particular terminal device is unsuccessful, the message can be routed to a device with the next-highest parameter, and so on.

A parameter may be compared to one or more absolute or relative thresholds. For example, parameters for a set of terminal devices can be compared to each other to identify a high parameter to select a terminal device to which a communication can be routed. As another example, a parameter (e.g., a high parameter) can be compared to one or more absolute thresholds to determine whether to establish a continuous channel with a terminal device. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 525 can interact with an account engine 530 in various contexts. For example, account engine 530 may look up an identifier of a network device or terminal device in an account data store 535 to identify an account corresponding to the device. Further, account engine 530 can maintain data about previous communication exchanges (e.g., times, involved other device(s), channel type, resolution stage, topic(s) and/or associated client identifier), connection channels (e.g., indicating—for each of one or more clients—whether any channels exist, a terminal device associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 525 can alert account engine 530 of various connection-channel actions, such that account data store 535 can be updated to reflect the current channel data. For example, upon establishing a channel, interaction management engine 525 can notify account engine 530 of the establishment and identify one or more of: a network device, a terminal device, an account and a client. Account engine 535 can (in some instances) subsequently notify a user of the channel's existence such that the user can be aware of the agent consistency being availed.

Interaction management engine 525 can further interact with a client mapping engine 540, which can map a communication to one or more clients (and/or associated brands). In some instances, a communication received from a network device itself includes an identifier corresponding to a client (e.g., an identifier of a client, webpage, or app page). The identifier can be included as part of a message (e.g., which client mapping engine 540 may detect) or included as other data in a message-inclusive communication. Client mapping engine 540 may then look up the identifier in a client data store 545 to retrieve additional data about the client and/or an identifier of the client.

In some instances, a message may not particularly correspond to any client. For example, a message may include a general query. Client mapping engine 540 may, for example, perform a semantic analysis on the message, identify one or more keywords and identify one or more clients associated with the keyword(s). In some instances, a single client is identified. In some instances, multiple clients are identified. An identification of each client may then be presented via a network device such that a user can select a client to communicate with (e.g., via an associated terminal device).

Client data store 545 can include identifications of one or more terminal devices (and/or agents) associated with the client. A terminal routing engine 550 can retrieve or collect data pertaining to each of one, more or all such terminal devices (and/or agents) so as to influence routing determinations. For example, terminal routing engine 550 may maintain a terminal data store 555, which can store information such as terminal devices' device types, operating system, communication-type capabilities, installed applications accessories, geographic location and/or identifiers (e.g., IP addresses). Some information can be dynamically updated. For example, information indicating whether a terminal device is available may be dynamically updated based on (for example) a communication from a terminal device (e.g., identifying whether the device is asleep, being turned off/on, non-active/active, or identifying whether input has been received within a time period); a communication routing (e.g., indicative of whether a terminal device is involved in or being assigned to be part of a communication exchange); or a communication from a network device or terminal device indicating that a communication exchange has ended or begun.

It will be appreciated that, in various contexts, being engaged in one or more communication exchanges does not necessarily indicate that a terminal device is not available to engage in another communication exchange. Various factors, such as communication types (e.g., message), client-identified or user-identified target response times, and/or system loads (e.g., generally or with respect to a user) may influence how many exchanges a terminal device may be involved in.

When interaction management engine 525 has identified a terminal device or client device to involve in a communication exchange or connection channel, it can notify terminal routing engine 550, which may retrieve any pertinent data about the terminal device from terminal data store 555, such as a destination (e.g., IP) address, device type, protocol, etc. Processing engine 510 can then (in some instances) modify the message-inclusive communication or generate a new communication (including the message) so as to have a particular format, comply with a particular protocol, and so on. In some instances, a new or modified message may include additional data, such as account data corresponding to a network device, a message chronicle, and/or client data.

A message transmitter interface 560 can then transmit the communication to the terminal device or client device. The transmission may include, for example, a wired or wireless transmission to a device housed in a separate housing. The terminal device can include a terminal device in a same or different network (e.g., local-area network) as the connection management system. Accordingly, transmitting the communication to the terminal device can include transmitting the communication to an inter- or intra-network connection component.

Figure 6:
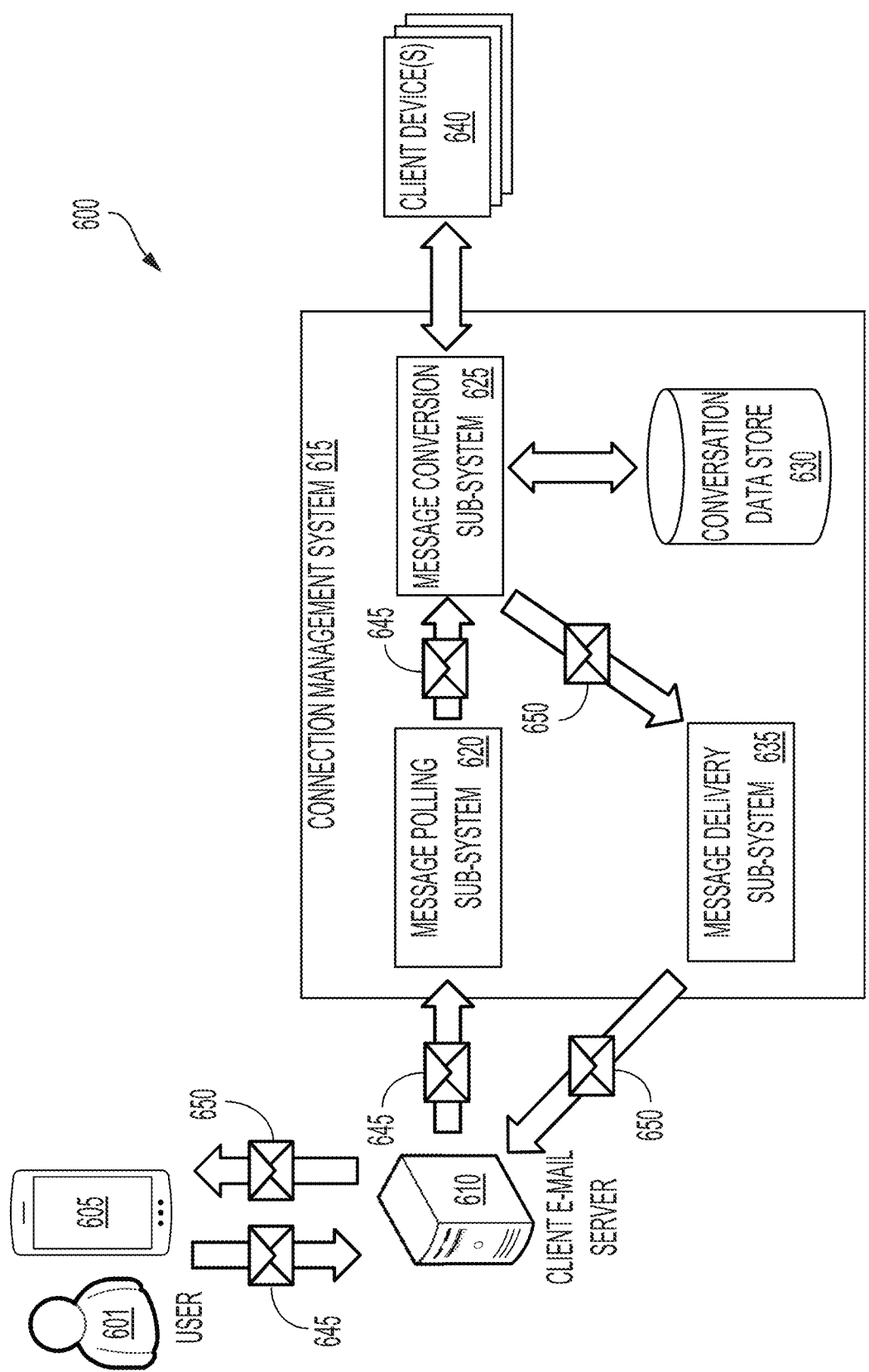
FIG. 6 shows a block diagram of a network environment for dynamic and automatic message processing during communication sessions.

FIG. 6 shows a block diagram of a network environment 600 for rerouting of communications during communication sessions. As shown in FIG. 6, a user 601 may use a network device 605 to send an e-mail message 645 to a particular client for assistance. Network device 605 may be any suitable device, such as a mobile device, that is capable of transmitting and receiving communications in the form of e-mail and text messages. In some embodiments, network device 605 may further be capable of making telephone calls. The e-mail message 645 may be addressed to a particular e-mail address associated with the client. For example, if the user 601 wishes to engage with a technician of the client to address a technical issue, the user 601 may generate, via the network device 605, an e-mail message 645 that is addressed to an e-mail address associated with a technical support group of the client. As another example, if the user 601 wishes to engage a billing specialist to address an issue associated with the user's bill, the user 601 may generate, via the network device 605, an e-mail message 645 that is addressed to an e-mail address associated with a billing group of the client. Thus, the recipient e-mail address utilized by the user 601 may indicate the particular group of the client that is to receive the e-mail message 645 and interact with the user 601 to address the issue specified therein.

The network device 605 may transmit the e-mail message 645 to an outgoing mail server (not shown) via Simple Mail Transfer Protocol (SMTP). The outgoing mail server may interact with a Domain Name System (DNS) server to identify the Internet Protocol (IP) address or other network address associated with the domain name specified in the recipient e-mail address and corresponding to the client e-mail server 610. The client e-mail server 610 may be in the form of any suitable server that is capable of serving as an e-mail exchange for the transmission and delivery of e-mail messages.

In an embodiment, the connection management system 615, via a message polling sub-system 620, polls the client e-mail server 610 to obtain any new e-mail messages received by the client e-mail server 610, including e-mail message 645 from the network device 605. The message polling sub-system 620 may be implemented on a computing system or other system (e.g., server, virtual machine instance, etc.) of the connection management system 615. Alternatively, the message polling sub-system 620 may be implemented as an application or other process executed on a computing system of the connection management system 615. Configuration of the message polling sub-system 620 may be performed by the client through the connection management system 615, whereby the client may configure its account to enable e-mail communications between its agents and users wishing to interact with the client. For instance, via the connection management system 615, the client may indicate that it wishes to connect its client e-mail server 610 to its connection management system account to allow for e-mail communications between users and the client's agents.

In an embodiment, the connection management system 615 enables a client to define which entity or group of entities associated with the client are to receive e-mail messages addressed to the client. For example, via the connection management system 615, a client may associate a particular e-mail address with a particular agent or group of agents that may be skilled in handling particular issues that users may send to the client. For example, a client may associate the e-mail address "techsupport@example.com" with an agent or group of agents that are skilled in handling technical support issues on behalf of the client. As another example, a client may associate the e-mail address "billing@example.com" with an agent or group of agents that are skilled in handling billing issues on behalf of the client.

In an embodiment, the connection management system 615 enables a client to associate a particular e-mail address with a bot or other automated process that may generate responses automatically and/or using machine learning algorithms and/or artificial intelligence. For instance, a bot or other automated process may evaluate a message from a user 601 to extract an intent expressed by the user 601 and that may be used to determine an appropriate response and/or resolution to the user's intent. For instance, in an embodiment, the bot may use a machine learning model to process the user's message in order to identify and extract the intent from the message. The machine learning model may be used to perform a semantic analysis of the message (e.g., by identifying keywords, sentence structures, repeated words, punctuation characters and/or non-article words) to identify the intent expressed in the message. The machine learning model utilized by the bot may be dynamically trained using supervised learning techniques. For instance, a dataset of input messages and known intents included in the input messages can be selected for training of the machine learning model. In some implementations, known intents used to train the machine learning model may include characteristics of these intents. The machine learning model may be evaluated to determine, based on the input sample messages supplied to the machine learning model, whether the machine learning model is extracting the expected intents from each of the messages. Based on this evaluation, the machine learning model may be modified to increase the likelihood of the machine learning model generating the desired results. The machine learning model may further be dynamically trained by soliciting feedback from users, including user 601, with regard to the extracted intent obtained from submitted messages. For instance, prior to submitting an extracted intent for resolution, the extracted intent may be presented to the user 601 to determine whether the extracted intent corresponds to the message submitted by the user 601. The response from the user 601 may, thus, be utilized to train the machine learning model based on the accuracy of the machine learning model in identifying the intent from the message.

In an embodiment, the bot uses natural language processing (NLP) or other artificial intelligence to query the user 601 for additional information that can be used to supplement the intent and allow for a tailored identification of an appropriate resolution for the intent. For instance, the bot may query the user 601 to identify a location of the user 601, what the timeframe is for resolution of the intent, and the like. Responses provided by the user 601 to the bot may be used to further narrow the set of actions that the bot may perform in responding to the user 601 and providing a resolution to the user's intent.

To setup a particular e-mail address for routing to particular agents, groups of agents, and/or bots, a client may provide, to the connection management system 615, the e-mail address, corresponding password or other credential information associated with the e-mail address, and e-mail settings. For example, the client may provide the Internet Message Access Protocol (IMAP) address of the client e-mail server 610, the SMTP address of the client e-mail server 610, and the like. The client, via the connection management system 615, may test the connection between the connection management system 615 and the client e-mail server 610 to ensure that e-mail messages may be polled from the client e-mail server 610 and that e-mail messages may be transmitted from the connection management system 615 to users via the client e-mail server 610.

In an embodiment, if the message polling sub-system 620 obtains an e-mail message 645 from the client e-mail server 610, the message polling sub-system 620 may transmit the e-mail message 645 to a message conversion sub-system 625 of the connection management system 615. The message conversion sub-system 625 may be implemented on a computing system or other system (e.g., server, virtual machine instance, etc.) of the connection management system 615. Alternatively, the message conversion sub-system 625 may be implemented as an application or other process executed on a computing system of the connection management system 615. In an embodiment, the message conversion sub-system 625 may extract, from the body of the e-mail message 645, the message from the user 601. Further, the message conversion sub-system 625 may extract the text from the subject line of the e-mail message 645, as the subject line may include additional information that may be pertinent to an agent or bot in identifying the user's intent.

In an embodiment, the message conversion sub-system 625 parses the e-mail address specified in the e-mail message 645 to identify which agent, group of agents, or bot is to receive the message. As noted above, a client may associate a particular e-mail address with an agent, group of agents, or bot that may interact with the connection management system 615 to engage with customers and other users of the client. In some instances, an agent or group of agents may interact with users via a communication session established by the connection management system 615 using an interface provided by the connection management system 615. This interaction may be presented via the interface in the form of a conversation, whereby messages exchanged between a user 601 and an agent may be represented to the agent in the form a chat within a chat window.

In an embodiment, the message conversion sub-system 625 accesses a conversation data store 630 to determine whether the received e-mail message 645 corresponds to an existing conversation between the user 601 and a particular agent or bot. For instance, the message conversion sub-system 625 may query the conversation data store 630 to identify any existing entries corresponding to a combination of the user's e-mail address or other identifying information (e.g., name, location, etc.) and the recipient e-mail address or particular skill corresponding to the recipient e-mail address (e.g., the client designation of agent, group of agents, or bots associated with a recipient e-mail address, etc.). If the message conversion sub-system 625 identifies, from the conversation data store 630, an existing conversation between the user 601 and an agent or bot corresponding to the recipient e-mail address, the message conversion sub-system 625 may determine whether the received e-mail message 645 corresponds to the existing conversation. For instance, the message conversion sub-system 625 may determine whether the received e-mail message 645 includes any prior communications between the agent/bot and the user 601 for the particular intent specified in the received e-mail message 645. As described in greater detail herein, e-mail messages between the user 601 and a particular agent/bot may include the complete conversation history between the user 601 and the particular agent/bot. Thus, if the message conversion sub-system 625 determines that the received e-mail message 645 does not include this conversation history and that the user 601 has an existing conversation with an agent/bot associated with the recipient e-mail address, the message conversion sub-system 625 may determine that the user 601 is trying to initiate an additional conversation with the agent/bot.

If the message conversion sub-system 625 determines that the user 601 is attempting to initiate an additional conversation with an agent/bot associated with the specified recipient e-mail address, the message conversion sub-system 625 may generate an automated response that may be transmitted to the user 601 in response to the e-mail message 645. The automated response may be defined by the client, whereby the client may provide a tailored response indicating to the user 601 that it has an existing conversation open with the client from a previous request or intent. Further, the client, via the automated response, may instruct the user 601 to respond to the existing e-mail thread corresponding to the existing conversation in order to continue the existing conversation with the client. The message conversion sub-system 625 may generate an e-mail message in response to the e-mail message 645 and incorporate this automated response into the e-mail message. The message conversion sub-system 625 may transmit this e-mail message to a message delivery sub-system 635 of the connection management system 615, which may transmit the e-mail message to the client e-mail server 610 for delivery to the user 601 via its network device 605.

If the message conversion sub-system 625 determines that the e-mail message 645 corresponds to an existing conversation between the user 601 and an agent/bot, the message conversion sub-system 625 may obtain the existing conversation from the conversation data store 630 and incorporate the extracted message from the e-mail message 645 into the existing conversation. The message conversion sub-system 625 may transmit the updated conversation to a client device 640 associated with the agent/bot for processing. In an embodiment, the conversation may be presented to the agent via a chat window, through which the agent may evaluate the complete conversation history and the new message from the user 601 in the context of the complete conversation history. Thus, rather than presenting the user's message from the e-mail message 645 in an e-mail format, the message conversion sub-system 625 may present the conversation between the user 601 and the agent in the form of a chat feed in order to mirror an actual conversation.

In an embodiment, if the message conversion sub-system 625 determines that the e-mail message 645 corresponds to a new intent or request, the message conversion sub-system 625 converts the body and subject line of the e-mail message 645 into a conversation message and determines an appropriate recipient for the conversation message. For instance, the message conversion sub-system 625 may evaluate the recipient e-mail address specified in the e-mail message 645 and identify, based on the recipient e-mail address, an agent, group of agents, or bot that is to receive the conversation message. For instance, if the recipient e-mail address corresponds to a particular agent, the message conversion sub-system 625 may transmit a notification to the client device 640 of the agent to indicate that a new conversation message has been received. The agent, via its client device 640, may access the connection management system 615, via a user interface provided by the connection management system 615, to access the conversation message via a chat window. The connection management system 615 may indicate, to the agent, that the conversation message was received via e-mail message 645. As another example, if the recipient e-mail address corresponds to a particular group of agents, the message conversion sub-system 625 may add the conversation message to an agent queue associated with the group of agents. This may allow an agent from the group of agents to retrieve the conversation message from the queue and access the conversation message via a chat window.

As noted above, an agent may review the conversation message via a chat window or other interface provided by the connection management system 615 as if the agent were engaged with the user 601 through a chat conversation. Through the chat window, the agent may review the conversation history (if any) and provide a response to the user 601. The response may be similar to a chat response, whereby the agent may interact with user 601 as if engaged in a typical chat conversation with the user 601. If the agent submits a response to the conversation message, the message conversion sub-system 625 may generate a new e-mail message 650 that may incorporate the agent's response for delivery to the user 601. In an embodiment, the message conversion sub-system 625 obtains, from the conversation data store 630, the complete conversation history between the agent/bot and the user 601 for inclusion in the new e-mail message 650. This conversation history may be used to provide context to the submitted response, as well as to provide a tracking mechanism for the message conversion sub-system 625 for the existing conversation between the user 601 and the agent/bot, as described above.

The message conversion sub-system 625 may convert the response from the agent/bot into an e-mail message format for inclusion in the new e-mail message 650. Further, the message conversion sub-system 625 may incorporate any existing conversation history between the user 601 and the agent/bot into the new e-mail message 650. The body of the new e-mail message 650 may thus provide the user 601 with the complete conversation history and provide context for the new message from the agent/bot. The new e-mail message 650 may be addressed to the user's e-mail address. Further, the sender e-mail address specified in the new e-mail message 650 may correspond to the recipient e-mail address specified in the original e-mail message 645 submitted by the user 601. The message conversion sub-system 625 may provide this new e-mail message 650 to the message delivery sub-system 635 of the connection management system 615 for delivery to the user 601. The message delivery sub-system 635 may be implemented on a computing system or other system (e.g., server, virtual machine instance, etc.) of the connection management system 615. Alternatively, the message delivery sub-system 635 may be implemented as an application or other process executed on a computing system of the connection management system 615.

The message delivery sub-system 635 may use the SMTP address of the client e-mail server 610 to transmit the new e-mail message 650 to the client e-mail server 610 for delivery to the network device 605. It should be noted that the SMTP address may correspond to an outgoing client e-mail server that is different from the incoming client e-mail server through which user e-mail messages are received. For instance, the IMAP address and the SMTP address may correspond to different client e-mail servers. The user 601 may receive, via its network device 605, the new e-mail message 650, which may include the complete conversation history between the user 601 and the agent/bot, as well as the most recent response from the agent/bot to the user's e-mail message 645. Thus, the user 601 may communicate with an agent/bot using e-mail messages, whereby responses are received in an e-mail format, and an agent/bot reviewing messages from the user 601 may interact with these messages as if the agent/bot were engaged with the user 601 via a chat session.

Figure 7:
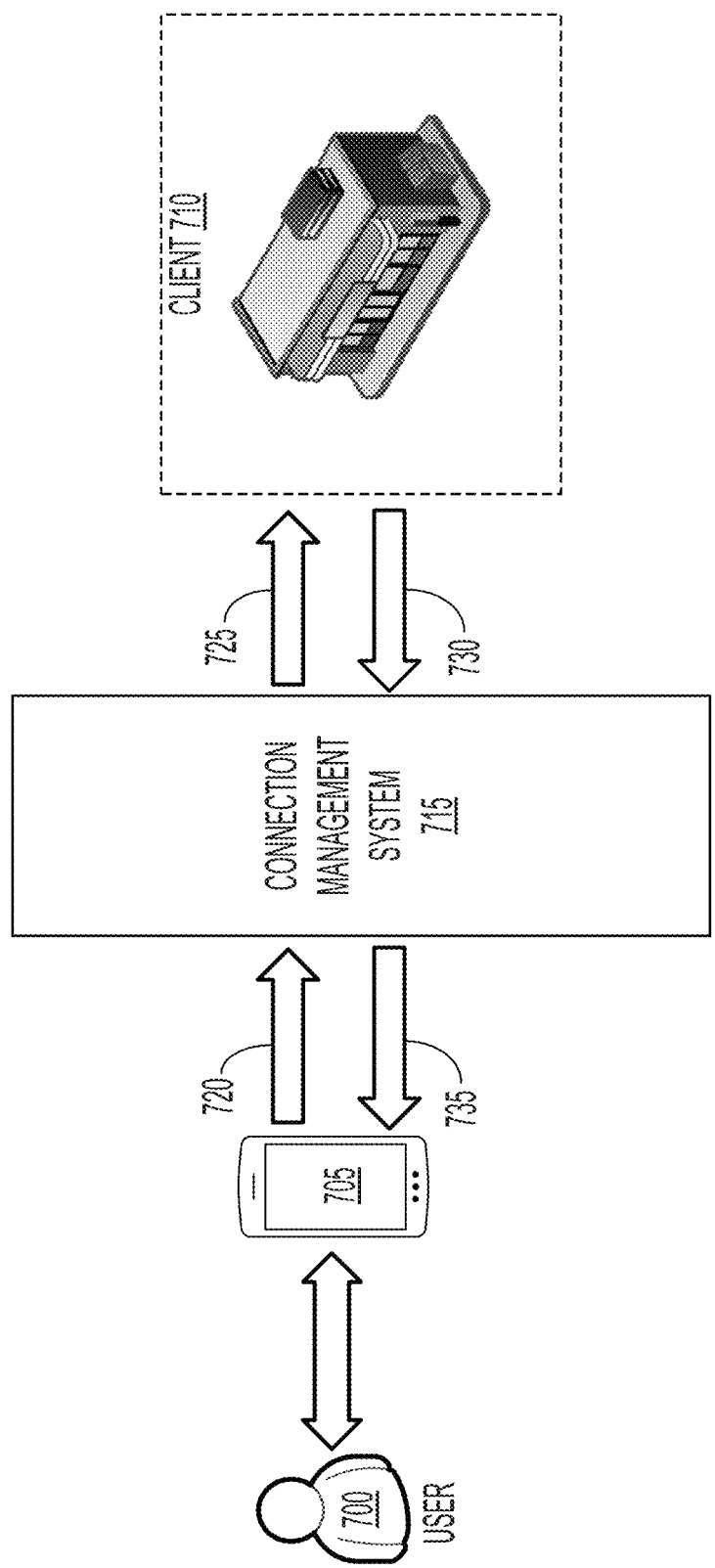
FIG. 7 shows a block diagram of a message environment that reroutes communications between e-mail and messaging environments.

FIG. 7 shows a block diagram of a message environment that reroutes communications between e-mail and messaging environments. A user 700 may use a network device 705 to send an e-mail message 720 to client 710. The e-mail 720 may be sent to an address associated with the client 710, or to an address of a server that the server routes to the client 710 based on information included in the e-mail message 720. In some embodiments, the e-mail message 720 may be sent after user 700 accesses a website or advertisement associated with client 710. Client 710 may be any goods or services provider.

For example, user 700 may use network device 705 to transmit an e-mail message 720 to client 710 stating, "Can I make an appointment?" Although shown as network device 705 initiating the conversation, it is contemplated that client 710 may alternatively initiate the conversation. For example, user 700 can use network device 705 to e-mail an address associated with client 710, and client 710 can respond via connection management system 715.

Connection management system 715 may intercept the message 720 and reroute the message 720 to a messaging environment, such as a chat environment as described above in connection with FIG. 6. Within the messaging environment, the message 720 may be converted into a conversation message 725 that may be presented to the client 710 via a chat window or other user interface supplied by the connection management system 715. In response, client 710 can search its scheduling system to determine when available appointments are, and send a response message 730 within the messaging environment stating, "Appointments are available Monday at 10 AM or 1 PM". Connection management system 715 may intercept the message 730 and reroute it to an e-mail environment, where the message 730 may be converted into an e-mail message 735. The new e-mail message 735 may include the response generated by the client 710, as well as any conversation history between the user 700 and the client 710 for the particular intent. The message 735 may then be routed to the network device 705.

Although shown and described with respect to connection management system 715 initiating its conversation with user 700 via network device 705, it is contemplated that user 700 may alternatively initiate a conversation with the connection management system 715. In addition, although shown and described as a direct connection between network device 705 and client 710, it is contemplated that connection management system 715 may similarly interface between the network device 705 and the client 710.

Figure 8:
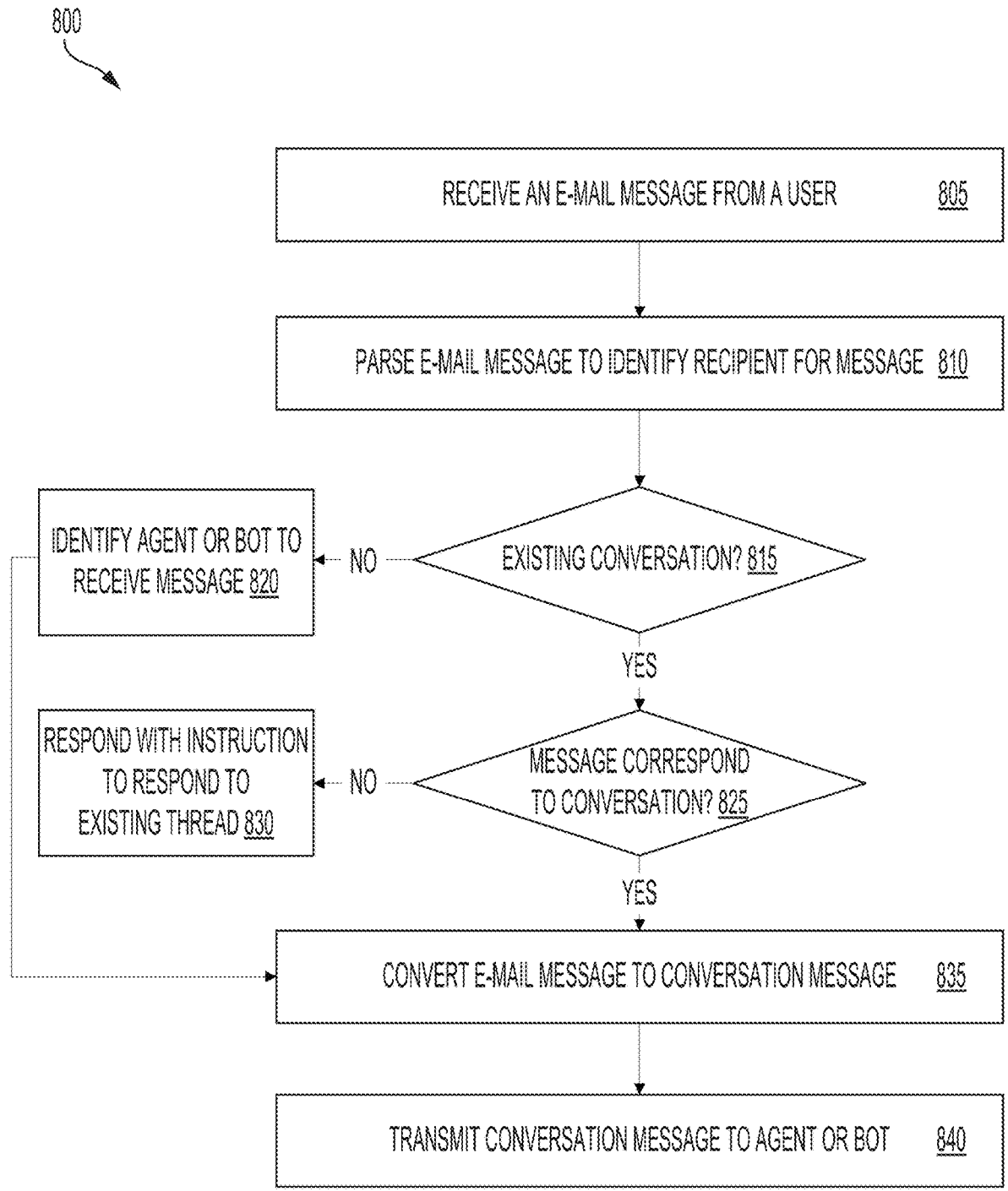
FIG. 8 shows an illustrative example of a process for routing an e-mail message from a user to an agent or bot associated with a client in the form a conversation message in accordance with at least one embodiment.

FIG. 8 shows an illustrative example of a process 800 for routing an e-mail message from a user to an agent or bot associated with a client in the form a conversation message in accordance with at least one embodiment. The process 800 may be performed by the aforementioned connection management system. At step 805, the connection management system receives an e-mail message from a user associated with a client. For instance, the connection management system may implement a message polling sub-system configured to poll a client e-mail server for e-mail messages addressed to the client domain. These e-mail messages may be submitted by users associated with the client and the e-mail messages may correspond to particular requests or intents for which users are seeking resolution from the client. For example, a user may submit an e-mail message to the client to address a technical issue, a billing issue, or any other issue that may be addressed by the client.

At step 810, the connection management system may parse the e-mail message to identify a particular entity that is to receive the message. For instance, in an embodiment, the connection management system evaluates the recipient e-mail address of the e-mail message to identify a particular skill associated with the recipient e-mail address, as defined by the client. The particular skill may correspond to a particular agent, a group of agents, or a bot configured by the client to generate automated responses to messages using artificial intelligence. For example, an e-mail message having a recipient e-mail address of "techsupport@example.com" may correspond to a technical support skill. The connection management system may evaluate the technical support skill and identify a particular agent, group of agents, or a bot associated with the client that are known to handle technical support issues on behalf of the client.

At step 815, the connection management system determines whether there is an existing conversation between the user and an agent, group of agents, or bot. For instance, the connection management system may query a conversation data store to identify any existing entries corresponding to a combination of the user's e-mail address or other identifying information (e.g., name, location, etc.) and the recipient e-mail address or particular skill corresponding to the recipient e-mail address. If the connection management system determines that there is no existing conversation between the user and an agent or bot associated with the recipient e-mail address or particular skill corresponding to the recipient e-mail address, the connection management system, at step 820, may identify an agent, group of agents, or bot that may receive the message and provide a response to the user. For instance, if the recipient e-mail address corresponds to a particular agent, the connection management system may transmit a notification to the client device of the agent to indicate that a new conversation message has been received. The agent, via its client device, may access the connection management system, via a user interface provided by the connection management system, to access the conversation message via a chat window. The connection management system may indicate, to the agent, that the conversation message was received via e-mail message. As another example, if the recipient e-mail address corresponds to a particular group of agents, the message conversion subsystem may add the conversation message to an agent queue associated with the group of agents. This may allow an agent from the group of agents to retrieve the conversation message from the queue and access the conversation message via a chat window.

If the connection management system identifies an existing conversation between the user and an agent or bot corresponding to the recipient e-mail address, the connection management system may determine, at step 825, whether the received e-mail message corresponds to the existing conversation. For instance, the connection management system may determine whether the received e-mail message includes any prior communications between the agent/bot and the user for the particular intent specified in the received e-mail message. If the connection management system determines that the received e-mail message does not include this conversation history and that the user has an existing conversation with an agent/bot associated with the recipient e-mail address, the connection management system may instruct the user to respond to the existing e-mail thread corresponding to the existing conversation in order to continue the existing conversation with the client at step 830.

If the connection management system determines that the e-mail message corresponds to an existing conversation between the user and an agent/bot, or that the e-mail message corresponds to a new intent or request for which an agent, group of agents, or bot have been identified, the connection management system, at step 835, may convert the received e-mail message into a conversation message that may be presented within a chat window of an agent or otherwise processed by an agent or bot as if the message was received over a chat session with the user. In an embodiment, if the e-mail message corresponds to an existing conversation between the user and an agent or bot, the connection management system may provide, in addition to the conversation message, the conversation history for the conversation to the agent or bot. This conversation history may include any previously obtained conversation messages provided to the agent or bot by the connection management system on behalf of the user and any responses submitted by the agent or bot to the user. At step 840, the connection management system may transmit the conversation message to the agent or bot for processing, along with any previous messages submitted by the user and agent/bot throughout the existing conversation. The conversation may be presented to an agent via a chat window, through which the agent may evaluate the complete conversation history and the new message from the user in the context of the complete conversation history. Thus, rather than presenting the user's message from the e-mail message in an e-mail format, the connection management system may present the conversation between the user and the agent in the form of a chat feed in order to mirror an actual conversation.

Figure 9:
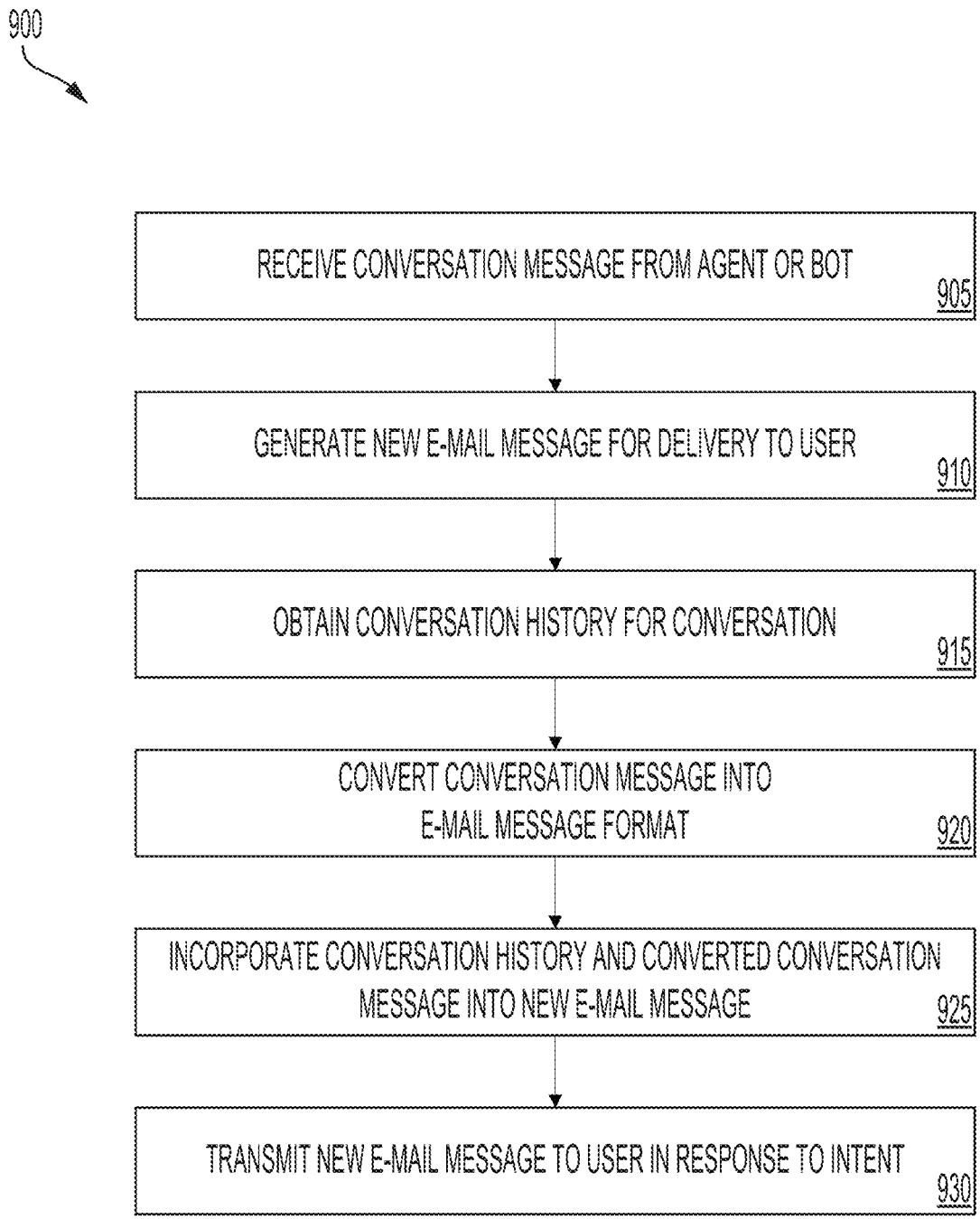
FIG. 9 shows an illustrative example of a process for converting a conversation message into an e-mail message for delivery to a user a conversation message in accordance with at least one embodiment.

FIG. 9 shows an illustrative example of a process 900 for converting a conversation message into an e-mail message for delivery to a user a conversation message in accordance with at least one embodiment. The process 900 may be performed by the aforementioned connection management system. At step 905, the connection management system receives a conversation message from an agent or bot for delivery to a user. As noted above, an agent may review a conversation message via a chat window or other interface provided by the connection management system as if the agent were engaged with a user through a chat session. Through the chat window, the agent may review the conversation history (if any) and provide a response to the user. The response may be similar to a chat response, whereby the agent may interact with user as if engaged in a typical chat session with the user.

If the agent submits a response to the conversation message from the user, the message connection management system, at step 910, may generate a new e-mail message that may incorporate the agent's response for delivery to the user. The new e-mail message may specify the user's e-mail address, as well as the e-mail address of the client originally used by the user to transmit the original e-mail message to the client for resolution of an intent or request. Further, at step 915, the connection management system obtains, from a conversation data store, the complete conversation history between the agent/bot and the user for inclusion in the new e-mail message. This conversation history may be used to provide context to the submitted response, as well as to provide a tracking mechanism for the connection management system for the existing conversation between the user and the agent/bot, as described above.

The connection management system, at step 920, may convert the response from the agent/bot into an e-mail message format for inclusion in the new e-mail message. Further, connection management system, at step 925, may incorporate any existing conversation history between the user and the agent/bot into the new e-mail message. The body of the new e-mail message may thus provide the user with the complete conversation history and provide context for the new message from the agent/bot. The new e-mail message may be addressed to the user's e-mail address. Further, the sender e-mail address specified in the new e-mail message may correspond to the recipient e-mail address specified in the original e-mail message submitted by the user.

At step 930, the connection management system may transmit the new e-mail message to the user in response to the user's intent or request. The connection management system, via a message delivery sub-system, may use the SMTP address of the client e-mail server to transmit the new e-mail message to the client e-mail server for delivery to the user. The user may receive, via its network device, the new e-mail message, which may include the complete conversation history between the user and the agent/bot, as well as the most recent response from the agent/bot to the user's e-mail message. Thus, the user may communicate with an agent/bot using e-mail messages, whereby responses are received in an e-mail format, and an agent/bot reviewing messages from the user may interact with these messages as if the agent/bot were engaged with the user via a chat session.

FIG. 10 shows an illustrative example of an interface 1000 for configuring e-mail message settings to enable e-mail messages from users to be routed to a corresponding agent, group of agents, or bot in accordance with at least one embodiment. As illustrated in FIG. 10, a client may interact with the interface 1000 to configure or otherwise setup their conversational environment to incorporate e-mail messaging between users and agents/bots associated with the client. As illustrated in FIG. 10, a client may define the type of e-mail account that is to be associated with a particular client e-mail address. For example, a client may associate the e-mail address "techsupport@example.com" with its Technical Support account. For this account, the client may provide its username, password, and/or any other sets of credentials that may be required to access the client's incoming and outgoing e-mail servers.

Through the interface, the client may be required to provide configuration information for its incoming and outgoing e-mail servers. For instance, as illustrated in FIG.

10, a client may be required to specify the incoming e-mail account type (e.g., IMAP) and the settings for the incoming e-mail account (e.g., the network address of the incoming e-mail account server, the port number for the incoming e-mail account server, whether Secure Sockets Layer (SSL) is enabled, etc.). Further, through the interface 1000, the client may be required to specify the outgoing e-mail account type (e.g., SMTP) and the settings for the outgoing e-mail account (e.g., the network address of the outgoing e-mail account server, the port number, whether SSL is enabled, etc.).

Once a client has used the interface 1000 to provide configuration information for its incoming and outgoing e-mail servers and the e-mail account settings, the client may test the connection between the connection management system and the client's incoming and outgoing e-mail servers to ensure that e-mail messages may be received from the incoming e-mail server and that e-mail messages may be sent to the outgoing e-mail server and are delivered to their corresponding destinations. If an issue is detected, the client may use the interface 1000 to troubleshoot the issue and change any configuration settings as needed. If a connection has been successfully established, the client may proceed to associate the e-mail account with a particular skill or entities that are to process messages addressed to the e-mail account.

Figure 11:
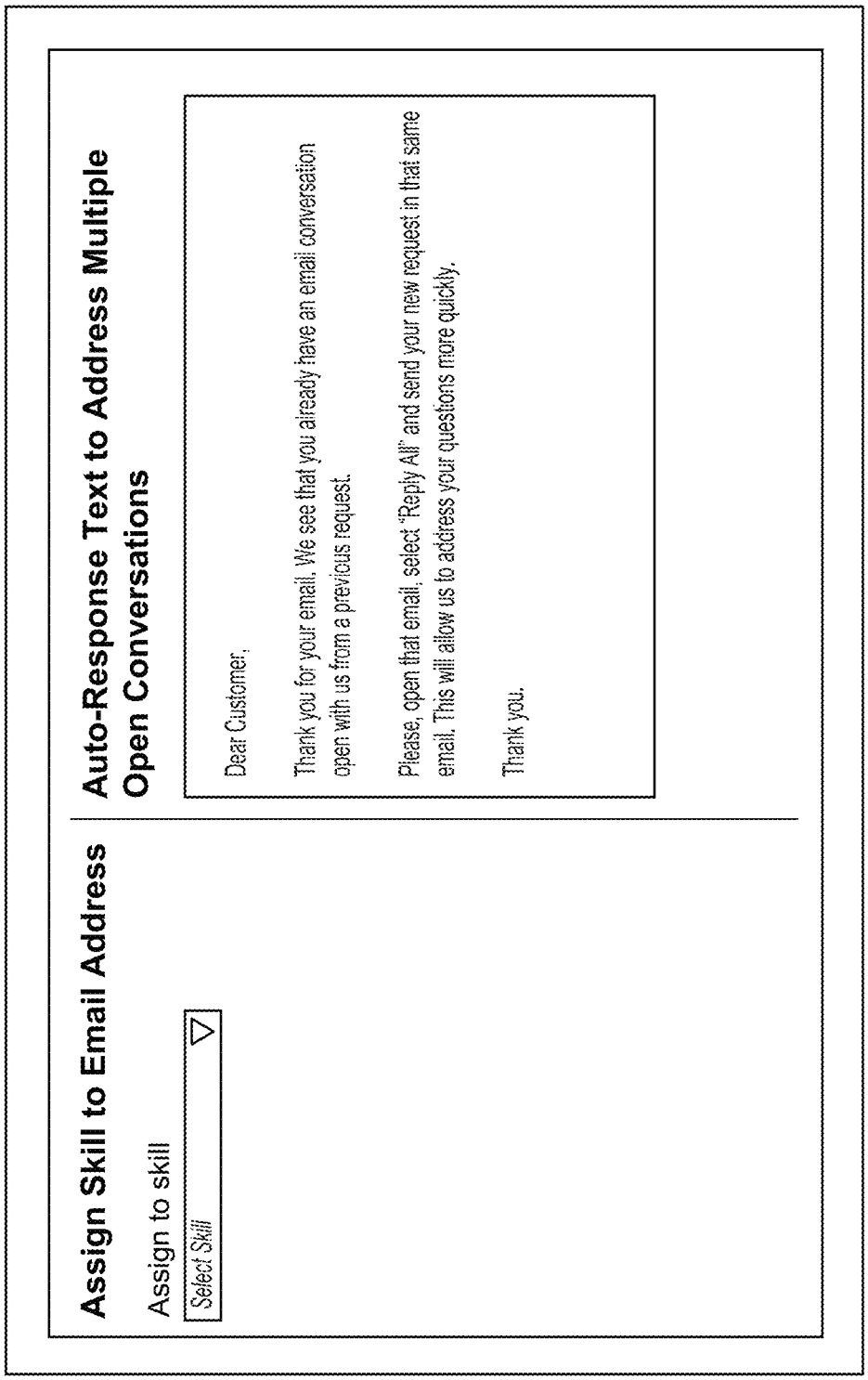
FIG. 11 shows an illustrative example of an interface for assigning a skill to a particular client e-mail address to enable forwarding of e-mail messages from users to a corresponding agent, group of agents, or bot in accordance with at least one embodiment.

FIG. 11 shows an illustrative example of an interface 1100 for assigning a skill to a particular client e-mail address to enable forwarding of e-mail messages from users to a corresponding agent, group of agents, or bot in accordance with at least one embodiment. Through the interface 1100, a client may be presented with its various skills via a drop down menu or other interface element. A skill may be an area of expertise of agents and/or bots associated with the client. A client may associate an agent, a group of agents, and/or bots to a particular skill such that if a received message is determined to require an agent or bot having a particular skill, the message may be routed to an agent or bot having this particular skill.

Through the interface 1100, a client may associate a particular client e-mail account or address to a particular skill. For example, a client may associate the e-mail address, "techsupport@example.com" with the "Technical Support" skill. This may cause the connection management system to route e-mail messages addressed to "techsupport@example.com" to an agent, a group of agents, and/or bots associated with the "Technical Support" skill.

As noted above, the connection management system may determine whether a received e-mail message includes any prior communications between an agent/bot and the user for a particular intent specified in the received e-mail message. If the connection management system determines that the received e-mail message does not include the conversation history and that the user has an existing conversation with an agent/bot associated with the recipient e-mail address, the connection management system may automatically instruct the user to respond to the existing e-mail thread corresponding to the existing conversation in order to continue the existing conversation with the client. Through the interface 1100, a client may generate a response that may be provided by the connection management system to automatically instruct the user to response to the existing e-mail thread (e.g., the open conversation). This response may serve as the instructions to the user to respond to the existing e-mail thread in order to continue its conversation with the agent/bot associated with the client.

FIG. 12 shows an illustrative example of an interface 1200 for configuring e-mail message headers and footers to be included in client e-mail message responses in accordance with at least one embodiment. Through the interface 1200, a client may define and/or upload the header and footer that is to be included in each e-mail message sent on behalf of the client to users. In an embodiment, the connection management system can require clients to define the header and footer to be included in their e-mail messages to users using a template supplied by the connection management system. For instance, through the interface 1200, the connection management system may instruct a client to download a HyperText Markup Language (HTML) example package that includes one or more files for defining a header and footer for client e-mail messages. These one or more files may include a set of instructions on how to create a header and a footer and templates for creating a header and footer. Using these templates, a client may generate a new header and/or footer that may be included automatically in its e-mail messages to users.

If the client submits a header and/or footer for inclusion in its e-mail messages, the connection management system may evaluate the provided header and/or footer to ensure that these satisfy one or more requirements of the connection management system. For instance, the connection management system may evaluate the provided header and/or footer to ensure that the provided header and/or footer do not include any malicious or otherwise unauthorized components. Further, the connection management system may evaluate the provided header and/or footer to ensure that these comply with one or more style guidelines established by the connection management system. If the connection management system determines that the provided header and/or footer do not comply with these guidelines or an issue is otherwise detected, the connection management system may reject the provided header and/or footer and instruct the client to make any necessary changes. However, if the connection management system determines that the provided header and/or footer satisfy the guidelines established by the connection management system, the connection management system may incorporate the provided header and/or footer into any messages from an agent or bot associated with the client and the corresponding client e-mail address to users.

FIG. 13 shows an illustrative example of an interface 1300 for engaging in a conversation with a user to address an intent or request in accordance with at least one embodiment. The interface 1300 may be utilized by an agent associated with a client. The agent may be assigned to a particular skill, such as "Technical Support," "Sales," "Billing," and the like. As noted above, a client may associate a particular e-mail account with a skill. As an illustrative example, a client may associate the e-mail account, "techsupport@example.com", with its "Technical Support" skill. This may cause the connection management system to route e-mail messages addressed to "techsupport@example.com" e-mail address to an agent, group of agents, or bot assigned to the "Technical Support" skill. As illustrated in FIG. 13, an agent associated with the client may obtain a message from a user as a result of the message being addressed to an e-mail address associated with the agent's assigned skill.

As noted above, the connection management system may convert an e-mail message from a user into a conversation message that may be presented to an agent within a chat window. As illustrated in FIG. 13, a message from a user is presented within a chat window as a conversation message. The conversation message may be similar to the body of the received e-mail message from the user, whereby the conversation message may indicate the intent or request that is to be addressed. The connection management system may indicate, via the interface 1300, that the conversation message from the user was converted from a received e-mail message. For instance, as illustrated in FIG. 13, the connection management system may indicate, for the particular conversation (e.g., chat session) between the user and the agent, that the user's message was received via an e-mail message, the client e-mail address used by the user, and the user's e-mail address.

In an embodiment, via the interface 1300, the agent can submit a conversation message that is responsive to the user's conversation message converted from its e-mail message. The connection management system may convert the agent's conversation message into an e-mail message that may be addressed to the user's e-mail address, as specified in the interface 1300. The connection management system may incorporate, into this e-mail message, any headers and/or footers uploaded by the client, as well as the existing conversation history between the user and the agent. This conversation history may be similar to the conversation history presented via the interface 1300. This conversation history may serve as an identifier for the communications session between the user and the agent. Thus, the user receiving the e-mail message may be able to review the conversation history and determine the context of the agent's response in an e-mail format. The user may respond to the e-mail message but transmitting another e-mail message to the client e-mail address and the response submitted by the user may be presented to the agent as a conversation message within the interface 1300.

Figure 14:
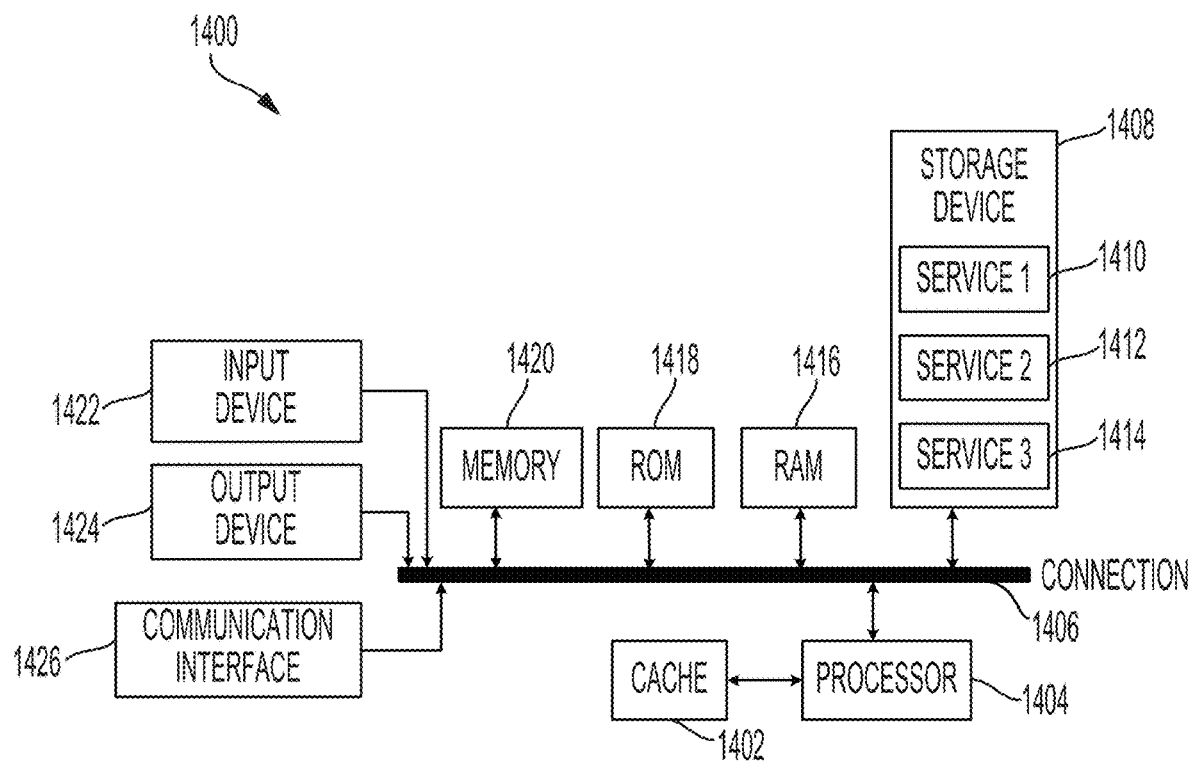
FIG. 14 shows an illustrative example of an environment in which various embodiments can be implemented.

FIG. 14 illustrates a computing system architecture 1400 including various components in electrical communication with each other using a connection 1406, such as a bus, in accordance with some implementations. Example system architecture 1400 includes a processing unit (CPU or processor) 1404 and a system connection 1406 that couples various system components including the system memory 1420, such as ROM 1418 and RAM 1416, to the processor 1404. The system architecture 1400 can include a cache 1402 of high-speed memory connected directly with, in close proximity to, or integrated as part of the processor 1404. The system architecture 1400 can copy data from the memory 1420 and/or the storage device 1408 to the cache 1402 for quick access by the processor 1404. In this way, the cache can provide a performance boost that avoids processor 1404 delays while waiting for data. These and other modules can control or be configured to control the processor 1404 to perform various actions.

Other system memory 1420 may be available for use as well. The memory 1420 can include multiple different types of memory with different performance characteristics. The processor 1404 can include any general purpose processor and a hardware or software service, such as service 1 1410, service 2 1412, and service 3 1414 stored in storage device 1408, configured to control the processor 1404 as well as a special-purpose processor where software instructions are incorporated into the actual processor design. The processor 1404 may be a completely self-contained computing system, containing multiple cores or processors, a bus, memory controller, cache, etc. A multi-core processor may be symmetric or asymmetric.

To enable user interaction with the computing system architecture 1400, an input device 1422 can represent any number of input mechanisms, such as a microphone for speech, a touch-sensitive screen for gesture or graphical input, keyboard, mouse, motion input, speech and so forth.

An output device 1424 can also be one or more of a number of output mechanisms known to those of skill in the art. In some instances, multimodal systems can enable a user to provide multiple types of input to communicate with the computing system architecture 1400. The communications interface 1426 can generally govern and manage the user input and system output. There is no restriction on operating on any particular hardware arrangement and therefore the basic features here may easily be substituted for improved hardware or firmware arrangements as they are developed.

Storage device 1408 is a non-volatile memory and can be a hard disk or other types of computer readable media which can store data that are accessible by a computer, such as magnetic cassettes, flash memory cards, solid state memory devices, digital versatile disks, cartridges, RAMs 1416, ROM 1418, and hybrids thereof.

The storage device 1408 can include services 1410, 1412, 1414 for controlling the processor 1404. Other hardware or software modules are contemplated. The storage device 1408 can be connected to the system connection 1406. In one aspect, a hardware module that performs a particular function can include the software component stored in a computer-readable medium in connection with the necessary hardware components, such as the processor 1404, connection 1406, output device 1424, and so forth, to carry out the function.

The disclosed methods can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method comprising:
receiving a request e-mail message addressed to an account associated with a client, wherein the request e-mail message specifies an intent to address an issue;
identifying a recipient for the request e-mail message, wherein the recipient is associated with the account;
training a machine learning model to perform a semantic analysis of e-mail messages to identify intents expressed in the e-mail messages, wherein the machine learning model is trained using a dataset of input e-mail messages and known intents included in the input e-mail messages;
using the request e-mail message as input to the machine learning model to identify the intent;
updating the machine learning model using the request e-mail message, the intent, feedback corresponding to identification of the intent from the request e-mail message, and the dataset of input e-mail messages and known intents;
transmitting the intent and additional information for identification of one or more resolutions for the intent, wherein the intent and the additional information is transmitted over a chat communication channel, and wherein when the intent and the additional information is received by the recipient, the recipient can determine a resolution from the one or more resolutions and respond using the chat communication channel;
receiving a response to the intent;
generating a response e-mail message, wherein the response e-mail message includes the response and a conversation history associated with the recipient and a sender of the request e-mail message; and
transmitting the response e-mail message.

2. The computer-implemented method of claim 1, wherein the intent is transmitted to the recipient with the conversation history associated with the recipient and the sender of the request e-mail message, wherein the intent is incorporated into the conversation history.

3. The computer-implemented method of claim 1, wherein:
the account is associated with a group of recipients; and
the computer-implemented method further comprises identifying the recipient from the group of recipients based on the intent.

4. The computer-implemented method of claim 1, wherein:
the account associated with the client is further associated with a skill; and
the recipient is identified as a result of the recipient being assigned to the skill.

5. The computer-implemented method of claim 1, further comprising inserting a header and footer into the response e-mail message, wherein the header and the footer are associated with the client.

6. The computer-implemented method of claim 1, further comprising polling a client server to receive the request e-mail message.

7. The computer-implemented method of claim 1, further comprising:
receiving another e-mail message;
determining that a conversation session corresponding to the request e-mail message is active; and
transmitting a response to the other e-mail message, wherein the response to the other e-mail message includes an instruction to utilize the conversation session corresponding to the request e-mail message.

8. A system, comprising:
one or more processors; and
memory storing thereon instructions that, as a result of being executed by the one or more processors, cause the system to:
receive a request e-mail message addressed to an account associated with a client, wherein the request e-mail message specifies an intent to address an issue;
identify a recipient for the request e-mail message, wherein the recipient is associated with the account;
train a machine learning model to perform a semantic analysis of e-mail messages to identify intents expressed in the e-mail messages, wherein the machine learning model is trained using a dataset of input e-mail messages and known intents included in the input e-mail messages;
use the request e-mail message as input to the machine learning model to identify the intent;
update the machine learning model using the request e-mail message, the intent, feedback corresponding to identification of the intent from the request e-mail message, and the dataset of input e-mail messages and known intents
transmit the intent and additional information for identification of one or more resolutions for the intent, wherein the intent and the additional information is transmitted over a chat communication channel, and wherein when the intent and the additional information is received by the recipient, the recipient can determine a resolution from the one or more resolutions and respond using the chat communication channel;
receive a response to the intent;
generate a response e-mail message, wherein the response e-mail message includes the response and a conversation history associated with the recipient and a sender of the request e-mail message; and
transmit the response e-mail message.

9. The system of claim 8, wherein:
the account associated with the client is further associated with a skill; and
the recipient is identified as a result of the recipient being assigned to the skill.

10. The system of claim 8, wherein the instructions further cause the system to insert a header and footer into the response e-mail message, wherein the header and the footer are associated with the client.

11. The system of claim 8, wherein the instructions further cause the system to poll a client server to receive the request e-mail message.

12. The system of claim 8, wherein the instructions further cause the system to:
receive another e-mail message;
determine that a conversation session corresponding to the request e-mail message is active; and
transmit a response to the other e-mail message, wherein the response to the other e-mail message includes an instruction to utilize the conversation session corresponding to the request e-mail message.

13. A non-transitory, computer-readable storage medium storing thereon executable instructions that, as a result of being executed by one or more processors of a computer system, cause the computer system to:

receive a request e-mail message addressed to an account associated with a client, wherein the request e-mail message includes a body, and wherein the body specifies an intent to address an issue;

identify a recipient for the request e-mail message, wherein the recipient is associated with the account;

train a machine learning model to perform a semantic analysis of e-mail messages to identify intents expressed in the e-mail messages, wherein the machine learning model is trained using a dataset of input e-mail messages and known intents included in the input e-mail messages;

use the request e-mail message as input to the machine learning model to identify the intent;

update the machine learning model using the request e-mail message, the intent, feedback corresponding to identification of the intent from the request e-mail message, and the dataset of input e-mail messages and known intents;

transmit the intent and additional information for identification of one or more resolutions for the intent, wherein the intent and the additional information is transmitted over a chat communication channel, and wherein when the intent and the additional information is received by the recipient, the recipient can determine a resolution from the one or more resolutions and respond using the chat communication channel;

receive a response to the intent;

generate a response e-mail message, wherein the response e-mail message includes the response and a conversation history associated with the recipient and a sender of the request e-mail message; and transmit the response e-mail message.

14. The non-transitory, computer-readable medium of claim 13, wherein the intent is transmitted to the recipient with the conversation history associated with the recipient and the sender of the request e-mail message, wherein the intent is incorporated into the conversation history.

15. The non-transitory, computer-readable medium of claim 13, wherein the executable instructions further cause the computer system to insert a header and footer into the response e-mail message, wherein the header and the footer are associated with the client.

16. The non-transitory, computer-readable medium of claim 13, wherein the executable instructions further cause the computer system to poll a client server to receive the request e-mail message.

17. The non-transitory, computer-readable medium of claim 13, wherein the executable instructions further cause the computer system to:

receive another e-mail message;

determine that a conversation session corresponding to the request e-mail message is active; and transmit a response to the other e-mail message, wherein the response to the other e-mail message includes an instruction to utilize the conversation session corresponding to the request e-mail message.

18. The computer-implemented method of claim 1, wherein the machine learning model is dynamically trained by soliciting the feedback corresponding to the identification of the intent from the request e-mail message.

19. The computer-implemented method of claim 1, wherein the machine learning model is trained and updated in real-time as request e-mail messages are received.

20. The system of claim 8, wherein the machine learning model is dynamically trained by soliciting the feedback corresponding to the identification of the intent from the request e-mail message.

21. The system of claim 8, wherein the machine learning model is trained and updated in real-time as request e-mail messages are received.

22. The system of claim 8, wherein:

the account is associated with a group of recipients; and the instructions further cause the system to identify the recipient from the group of recipients based on the intent.

23. The system of claim 8, wherein the intent is transmitted to the recipient with the conversation history associated with the recipient and the sender of the request e-mail message, wherein the intent is incorporated into the conversation history.

24. The non-transitory, computer-readable medium of claim 13, wherein:

the account is associated with a group of recipients; and the executable instructions further cause the computer system to identify the recipient from the group of recipients based on the intent.

25. The non-transitory, computer-readable medium of claim 13, wherein:

the account associated with the client is further associated with a skill; and the recipient is identified as a result of the recipient being assigned to the skill.

26. The non-transitory, computer-readable medium of claim 13, wherein the machine learning model is dynamically trained by soliciting the feedback corresponding to the identification of the intent from the request e-mail message.

27. The non-transitory, computer-readable medium of claim 13, wherein the machine learning model is trained and updated in real-time as request e-mail messages are received.

* * * * *